(12) United States Patent　　(10) Patent No.:　　US 9,643,789 B2
Teichrob et al.　　　　　　　　　(45) Date of Patent:　　　May 9, 2017

(54) CONTROL SYSTEM FOR MATERIAL HANDLING CONVEYOR VEHICLE

(71) Applicant: Ty-Crop Manufacturing Ltd., Rosedale (CA)

(72) Inventors: Gary Wayne Teichrob, Rosedale (CA); Thomas Abraham Jansen, Rosedale (CA)

(73) Assignee: TY-CROP MANUFACTURING LTD., British Columbia (CA)

( * ) Notice: Subject to any disclaimer, the term of this patent is extended or adjusted under 35 U.S.C. 154(b) by 0 days.

(21) Appl. No.: 14/732,928

(22) Filed: Jun. 8, 2015

(65) Prior Publication Data

US 2015/0353291 A1　　Dec. 10, 2015

Related U.S. Application Data

(60) Provisional application No. 62/009,746, filed on Jun. 9, 2014.

(51) Int. Cl.
*B65G 41/00*　　(2006.01)
*G05D 1/02*　　(2006.01)

(52) U.S. Cl.
CPC ......... *B65G 41/008* (2013.01); *B65G 41/001* (2013.01); *B65G 41/005* (2013.01); *G05D 1/021* (2013.01)

(58) Field of Classification Search
None
See application file for complete search history.

(56) References Cited

U.S. PATENT DOCUMENTS 1,346,990 A　　7/1920　Lee
2,124,687 A　　7/1938　Carson
(Continued)

FOREIGN PATENT DOCUMENTS

DE　　　4235276 A1　　4/1994
GB　　　2222995 A　　3/1990
WO　　WO 99/50091 A1　10/1999

OTHER PUBLICATIONS

Superior Industries (Dec. 6, 2010): Superior RazerTail Truck Unloader Promotional Video: Whole Video Retrieved from https://www.youtube.com/watch?v=FFEcn2HX2WY on Aug. 4, 2016.*

(Continued)

*Primary Examiner* — Mussa A Shaawat
*Assistant Examiner* — Abdhesh Jha
(74) *Attorney, Agent, or Firm* — Sterne, Kessler, Goldstein & Fox P.L.L.C.

(57) ABSTRACT

Control solutions for a mobile conveyor vehicle are provided. The vehicle includes a pair of movable belt conveyor systems for conveying bulk material to an elevated location. One of the conveyors may be rotated via turntable while the other is rotated by four-wheel steering motion of the vehicle. The control system may be configured to: receive user input indicative of desired infeed location of the infeed end and a desired output location of the output end; determine a desired control solution for disposing the infeed end at the desired infeed location and disposing the output end at the desired output location; and cooperatively operate the first powered actuator system, the second powered actuator system and the powered drive system according to the desired control solution.

26 Claims, 18 Drawing Sheets

(56) References Cited

U.S. PATENT DOCUMENTS

| | | |
|---|---|---|
| 3,086,465 A | 4/1963 | De Montfort |
| 3,095,097 A | 6/1963 | Mellow |
| 3,231,066 A | 1/1966 | Harrison etal. |
| 3,265,232 A | 8/1966 | Lythgoe |
| 3,285,439 A | 11/1966 | Haverson |
| 3,310,161 A | 3/1967 | Kraft, Jr. |
| 3,314,557 A | 4/1967 | Sackett, Sr. |
| 3,501,193 A | 3/1970 | Gray |
| 3,530,832 A | 9/1970 | De Satnick |
| 3,567,048 A | 3/1971 | Whitham |
| 3,653,486 A | 4/1972 | McLean et al. |
| 3,669,245 A | 6/1972 | Wooten et al. |
| 3,753,506 A | 8/1973 | Palmer et al. |
| 3,884,346 A | 5/1975 | O'Neill et al. |
| 3,899,037 A | 8/1975 | Yuker |
| 3,934,739 A | 1/1976 | Zumsteg et al. |
| 4,101,019 A | 7/1978 | Satterwhite |
| 4,187,047 A | 2/1980 | Squifflet, Sr. |
| 4,198,186 A | 4/1980 | Holdren et al. |
| 4,268,208 A | 5/1981 | Murray et al. |
| 4,319,677 A | 3/1982 | Kipper |
| 4,330,232 A | 5/1982 | McClaren |
| 4,345,869 A | 8/1982 | King |
| 4,387,798 A | 6/1983 | Jamison et al. |
| 4,392,776 A | 7/1983 | Shum |
| 4,465,420 A | 8/1984 | Dillman |
| 4,482,281 A | 11/1984 | Musil |
| 4,491,216 A | 1/1985 | Sawboy |
| 6,386,352 B1 | 5/1985 | Aarflot |
| 4,561,821 A | 12/1985 | Dillman |
| 4,568,239 A | 2/1986 | Sims |
| 4,624,357 A | 11/1986 | Oury et al. |
| 4,629,060 A | 12/1986 | Schlegel et al. |
| 4,701,095 A | 10/1987 | Berryman et al. |
| 4,813,526 A | 3/1989 | Belanger |
| 4,917,560 A | 4/1990 | Murray et al. |
| 4,924,993 A | 5/1990 | Buxton |
| 4,944,646 A | 7/1990 | Edwards et al. |
| 5,087,155 A | 2/1992 | Herman et al. |
| 5,125,771 A | 6/1992 | Herman et al. |
| 5,129,506 A | 7/1992 | Gutov et al. |
| 5,141,528 A | 8/1992 | Boczkiewicz et al. |
| 5,203,442 A | 4/1993 | Oury et al. |
| 5,203,628 A | 4/1993 | Hamm |
| 5,277,489 A | 1/1994 | Hamm |
| 5,297,665 A | 3/1994 | Smith |
| 5,339,996 A | 8/1994 | Dubbert et al. |
| 5,340,259 A | 8/1994 | Flaskey et al. |
| 5,427,497 A | 6/1995 | Dillman |
| 5,431,523 A | 7/1995 | Ferguson |
| 5,577,618 A | 11/1996 | Rafferty |
| 5,640,996 A | 6/1997 | Schlecht et al. |
| 5,865,300 A | 2/1999 | Newsome |
| 6,135,171 A | 10/2000 | Weakly et al. |
| 6,186,311 B1 | 2/2001 | Conner |
| 6,186,654 B1 | 2/2001 | Gunteret, Jr. et al. |
| 6,283,269 B1 | 9/2001 | Mayer |
| 6,293,689 B1 | 9/2001 | Gunteret, Jr. et al. |
| 6,360,876 B1 | 3/2002 | Nohl et al. |
| 6,367,610 B1 | 4/2002 | Fortenbery et al. |
| 6,378,686 B1 | 4/2002 | Mayer et al. |
| 6,527,428 B2 | 3/2003 | Gunteret, Jr. et al. |
| 6,540,039 B1 | 4/2003 | Yu et al. |
| 6,543,622 B1 | 4/2003 | Fridman |
| 6,688,450 B2 | 2/2004 | Speers et al. |
| 5,634,716 A1 | 11/2004 | Brock et al. |
| 6,810,976 B2 | 11/2004 | Rohrs |
| 6,827,198 B1 | 12/2004 | Costanzo |
| 6,866,071 B2 | 3/2005 | Fischer |
| 6,910,586 B2 | 6/2005 | McClosckey |
| 6,929,113 B1 | 8/2005 | Hoover et al. |
| 6,986,294 B2 | 1/2006 | Fromme et al. |
| 7,150,352 B2 | 12/2006 | Cotter et al. |
| 7,198,278 B2 | 4/2007 | Donaldson |
| 7,223,059 B2 | 5/2007 | Smith et al. |
| 7,255,194 B2 | 8/2007 | Lim et al. |
| 7,296,676 B2 | 11/2007 | Smith et al. |
| 7,789,217 B2 | 9/2010 | Fischer et al. |
| 7,887,110 B2 | 2/2011 | Cheng et al. |
| 7,946,416 B2 | 5/2011 | Grose et al. |
| 8,025,140 B2 | 9/2011 | Whyte et al. |
| 8,033,376 B2 | 10/2011 | Toews et al. |
| 8,322,507 B2 | 12/2012 | Demong et al. |
| 8,348,044 B2 | 1/2013 | Tebbe et al. |
| 8,408,377 B2 | 4/2013 | Werlinger et al. |
| 8,640,855 B2 | 2/2014 | Brobst |
| 8,944,239 B2 | 2/2015 | Campbell et al. |
| 8,944,740 B2 | 2/2015 | Teichrob et al. |
| 9,079,470 B2 | 7/2015 | Slawson |
| 8,251,199 B2 | 10/2015 | Emerson |
| 9,334,124 B2 | 5/2016 | Teichrob et al. |
| 9,428,348 B2 | 8/2016 | Teichrob et al. |
| 2007/0029170 A1 | 2/2007 | Anagnost |
| 2007/0193798 A1* | 8/2007 | Allard .................... H04L 67/12 180/169 |
| 2008/0008562 A1 | 1/2008 | Beckel et al. |
| 2008/0179054 A1 | 7/2008 | McCough et al. |
| 2009/0078410 A1 | 3/2009 | Krenek et al. |
| 2010/0008750 A1 | 1/2010 | Jones |
| 2013/0062169 A1 | 3/2013 | Johannsen |
| 2013/0118862 A1* | 5/2013 | Stewart .................. B65G 21/12 198/300 |
| 2014/0023467 A1 | 1/2014 | Begley et al. |
| 2015/0044004 A1 | 2/2015 | Pham et al. |
| 2015/0336747 A1 | 11/2015 | Teichrob et al. |

OTHER PUBLICATIONS

"Sand Silo Sites", FB Industries Inc., Winkler, MB, Canada; Nov. 12, 2010.
Office Action for U.S. Appl. No. 12/909,357, dated Sep. 20, 2013, 6 pages.
Office Action for U.S. Appl. No. 12/909,357, dated Feb. 27, 2014, 10 pages.
Office Action for U.S. Appl. No. 12/909,357, dated Jul. 31, 2014, 8 pages.
Notice of Allowance for U.S. Appl. No. 12/909,357, dated Sep. 24, 2014.
Office Action for U.S. Appl. No. 13/452,422, dated Mar. 13, 2015, 13 pages.
Office Action for U.S. Appl. No. 14/286,488, dated Sep. 4,2015, 6 pages.
Office Action for U.S. Appl. No. 13/452,422, dated Sep. 18, 2015, 15 pages.
"Dual-Direction Discharge Conveyor," Cisco-Eagle, accessed Oct. 1,2015, <http://www.cisco-eagle.com/catalog/c-4220-dual-direction-tilting-discharge-belt-conveyor.asp>.
"Pro-Belt: Horizontal Curve Design," Professional Designers & Engineers, Inc., accessed Oct. 1, 2015, <http://www.pro-belt.com/hcurve.htm>.
"Ryson Vertical Conveying Solution," Ryson International, Inc., accessed Oct. 1, 2015, <http://www.ryson.com/>.
Office Action for U.S. Appl. No. 13/452,422, dated Dec. 30, 2015, 16 pages.
Office Action for U.S. Appl. No. 14/286,488, dated Jan. 19, 2016, 13 pages.
Notice of Allowance for U.S. Appl. No. 14/945,944, dated Feb. 1, 2016.
Notice of Allowance for U.S. Appl. No. 13/452,422, dated May 24, 2016.
Notice of Allowance for U.S. Appl. No. 14/286,488, dated Jul. 27, 2016.
"Superior Telestacker® Conveyor Promotional Video," Superior Industries, uploaded on Nov. 5, 2010, accessed Nov. 16, 2016, <https://www.youtube.com/watch?v=WmnUqC60aJw>.

* cited by examiner

CONTROL SYSTEM FOR MATERIAL HANDLING CONVEYOR VEHICLE

CROSS REFERENCE TO RELATED APPLICATION

This patent application claims the benefit of U.S. Provisional Patent Application No. 62/009,746, filed on Jun. 9, 2014, which is incorporated herein by reference in its entirety.

FIELD OF THE INVENTION

The present invention pertains in general to bulk material handling systems and in particular to control of mobile conveyor systems for moving bulk granular material from one location to another.

BACKGROUND

Granular material, such as sand or hydraulic fracturing proppant, is used in bulk quantity in a number of applications. For example, in hydraulic fracture drilling by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water. For such activities, it is desirable to have sufficient and often large amounts of granular material readily available for adequately reliably carrying out operations.

One component of an on-site mobile granular material delivery system is a mobile conveyor, which receives the material from a source such as a delivery truck, barge or rail car and conveys the material to an elevated location such as the input of a storage container. However, existing mobile conveyors can suffer from a variety of drawbacks, such complexity of operation potentially requiring a large number of personnel, and various design limitations that can limit performance of the delivery system. In particular, existing control systems and method may be inefficient, require excessive numbers of operators and/or excessive operator expertise.

Therefore there is a need for a control system for a bulk granular material conveyor that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a control system for a vehicle for conveying bulk granular material. In accordance with an aspect of the present invention, there is provided a control system for a mobile conveyor vehicle for transporting material, the mobile conveyor vehicle including: a first belt conveyor system and a second belt conveyor system mounted on a chassis and cooperatively coupled for conveyance of the material from an infeed end of the first belt conveyor system to an output end of the second belt conveyor system; a first powered actuator system coupled to the first belt conveyor system for driving the infeed end to a desired location relative to the vehicle; a second powered actuator system coupled to the second belt conveyor system for driving the output end to a desired location relative to the vehicle; and a steerable, powered drive system for supporting and transporting the vehicle on a surface; the control system comprising: an operator interface configured to receive user input indicative of desired infeed location of the infeed end and a desired output location of the output end; a computation module configured to determine a desired control solution for disposing the infeed end at the desired infeed location and disposing the output end at the desired output location; and a control centre configured to cooperatively operate the first powered actuator system, the second powered actuator system and the powered drive system according to the desired control solution.

In accordance with another aspect of the present invention, there is provided a method for controlling a mobile conveyor vehicle for transporting material, the mobile conveyor vehicle including: a first belt conveyor system and a second belt conveyor system mounted on a chassis and cooperatively coupled for conveyance of the material from an infeed end of the first conveyor to an output end of the second conveyor; a first powered actuator system coupled to the first belt conveyor system for driving the infeed end to a desired location relative to the vehicle; a second powered actuator system coupled to the second belt conveyor system for driving the output end to a desired location relative to the vehicle; and a steerable, powered drive system for supporting and transporting the vehicle on a surface; the method implemented automatically using a computer operatively coupled to a user interface, sensors of the vehicle and actuators for controlling the vehicle, the method comprising: receiving user input indicative of desired infeed location of the infeed end and a desired output location of the output end; determining a desired control solution for disposing the infeed end at the desired infeed location and disposing the output end at the desired output location; and cooperatively operating the first powered actuator system, the second powered actuator system and the powered drive system according to the desired control solution.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1A:
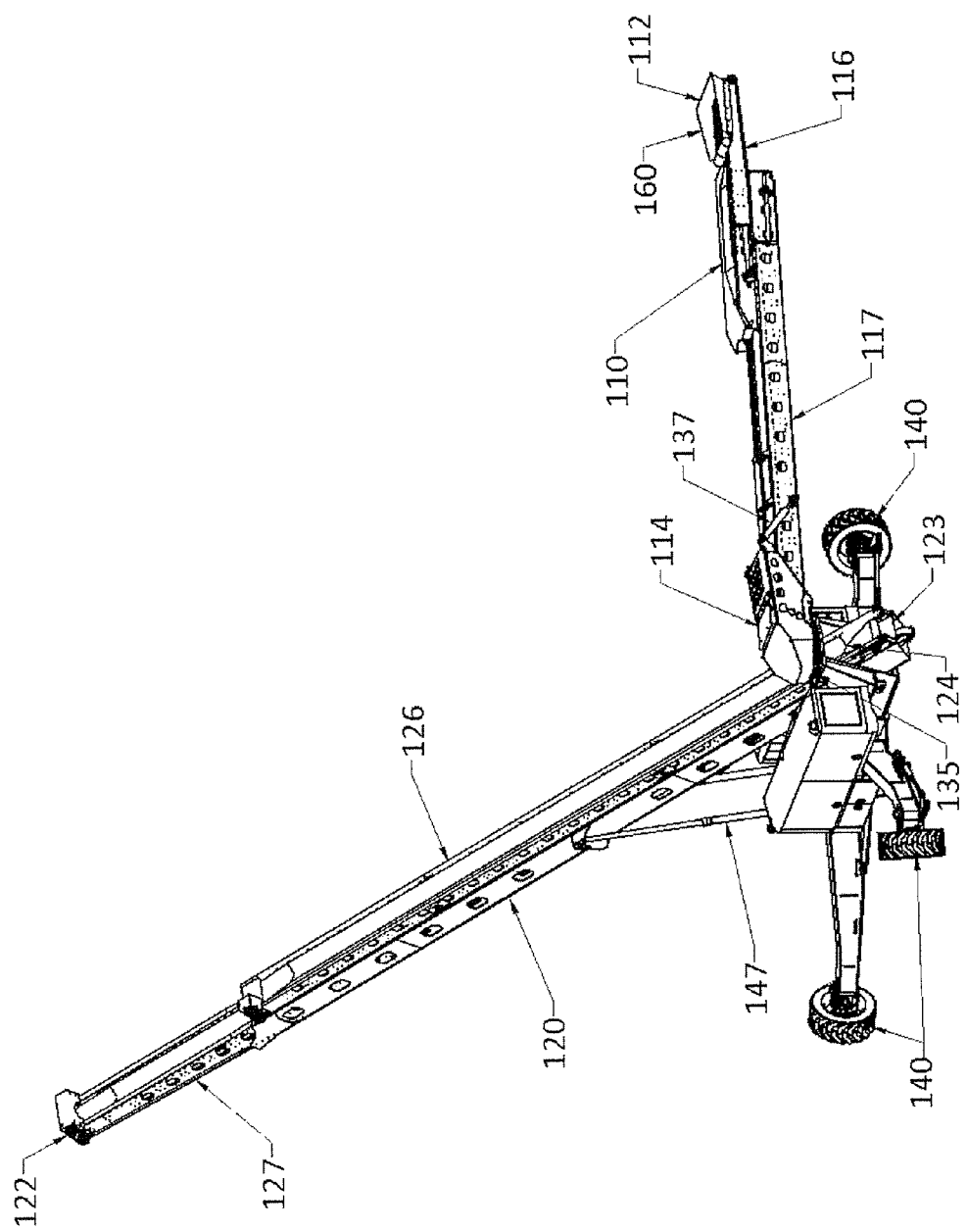
FIGS. 1A to 1D illustrate a conveyor vehicle provided in accordance with one embodiment of the invention.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention generally relates to control of a conveyor vehicle for transporting bulk material, such as sand, proppant, or the like. The vehicle includes a system of conveyors for transporting the material and a drive system for moving the vehicle relative to the ground, and aspects of the present invention may relate to control of one or both of the conveyor system and the drive system, as will be discussed in more detail below.

An aspect of the present invention provides for a control system for a mobile conveyor vehicle for conveying bulk material. The mobile conveyor vehicle includes a first belt conveyor system and a second belt conveyor system mounted on a chassis and cooperatively coupled for conveyance of the material from an infeed end of the first conveyor to an output end of the second conveyor. The mobile conveyor vehicle further includes a first powered actuator system coupled to the first belt conveyor system for driving the infeed end to a desired location relative to the vehicle, a second powered actuator system coupled to the second belt conveyor system for driving the output end to a desired location relative to the vehicle, and a steerable, powered drive system for supporting and transporting the vehicle on a surface. The control system in particular is configured to receive operator input indicative of desired infeed location of the infeed end and a desired output location of the output end, determine a desired control solution for disposing the infeed end at the desired infeed location and disposing the output end at the desired output location, and cooperatively operate the first powered actuator system, the second powered actuator system and the powered drive system according to the desired control solution.

In some embodiments, when one of the conveyors is coupled to the vehicle chassis in a non-rotatable manner with respect to yaw and the other one of the conveyors is mounted to the vehicle via a turntable, disposing an end of that conveyor at the desired location comprises rotating of the vehicle via operation of the powered drive system, for example corresponding to rotation in place. Concurrently disposing an end of the other conveyor comprises rotating of the turntable to which that conveyor is mounted.

Another aspect of the present invention provides for a method for controlling a mobile conveyor vehicle for conveying bulk material. The mobile conveyor vehicle includes a first belt conveyor system and a second belt conveyor system mounted on a chassis and cooperatively coupled for conveyance of the material from an infeed end of the first conveyor to an output end of the second conveyor. The mobile conveyor vehicle further includes a first powered actuator system coupled to the first belt conveyor system for driving the infeed end to a desired location relative to the vehicle, a second powered actuator system coupled to the second belt conveyor system for driving the output end to a desired location relative to the vehicle, and a steerable, powered drive system for supporting and transporting the vehicle on a surface. The method comprises receiving operator input indicative of desired infeed location of the infeed end and a desired output location of the output end; determining a desired control solution for disposing the infeed end at the desired infeed location and disposing the output end at the desired output location; and cooperatively operating the first powered actuator system, the second powered actuator system and the powered drive system according to the desired control solution.

Conveyor Vehicle

A conveyor vehicle subject to control via the present invention includes an infeed conveyor system for receiving bulk material from a source, and an output conveyor system for receiving the bulk material from the infeed conveyor system and delivering it to a destination. One or both of the infeed conveyor system and the output conveyor system may comprise a telescoping set of belt conveyors to facilitate length adjustment. The two conveyor systems are pivotable and/or rotatable relative to each other, for example by mounting each of the conveyor systems on separate powered turntable or by mounting one of the conveyor systems on a powered turntable and rotating the other conveyor system by rotation-in-place of the entire vehicle via ground-contacting wheels, tracks, or the like. At least one of the two conveyor systems may be vertically pivotable such that its distal end can be raised and lowered by actuated by a mechanical mechanism. Extension and rotation of the conveyor systems is facilitated by mechanical mechanisms, such as motors, drive belts, gears, hydraulic cylinders, or the like, or a combination thereof.

The conveyor vehicle further comprises a steerable, powered drive system which is configured for transporting the vehicle and optionally rotation-in-place of the vehicle. The drive system may be a conventional wheeled or tracked drive system driven by a motor or hydraulic system. Skid steering may be an optional means for rotating a tracked or wheeled vehicle according to some embodiments, although this may result in wheel drag which may be undesirable in some embodiments.

In some embodiments, the drive system includes a four-wheel steering component for rotation of the vehicle about a predetermined or selected pivot point. The pivot point may be vertically aligned with a point on the vehicle, such that this point on the vehicle remains substantially stationary while the vehicle rotates. When the pivot point aligns or nearly aligns with a portion of the vehicle, then the rotation is described as rotation-in-place of the vehicle. In some embodiments, the location of the pivot point is adjustable. More particularly, rotation of the vehicle is configured to cause corresponding rotation of one of the conveyor systems mounted to and extending from the vehicle, thereby facilitating desired positioning of a distal end of this conveyor system. This conveyor system may therefore optionally be non-rotatably mounted to the vehicle chassis, which eliminates the requirement for a powered turntable for rotating the conveyor while the vehicle chassis remains stationary. The pivot point may be a single point in space or alternatively a region in space.

In some embodiments, the vehicle wheels may be mounted on respective pivotable support arms, also referred to as outriggers, that extend from the vehicle chassis. Each support arm may be driven by a drive mechanism, such as a hydraulic cylinder coupled between the chassis and the support arm for controllable and powered pivoting thereof.

In one embodiment, the vehicle includes four pivotable support arms supporting four-wheel steerable wheels capable of rotation in place, a first conveyor mounted on a powered turntable and another conveyor non-rotatably mounted to the vehicle chassis. In another embodiment, the vehicle includes wheels mounted to the vehicle chassis and a pair of powered turntables to which the infeed and output conveyors are mounted, respectively.

FIGS. 1A to 1D illustrate a conveyor vehicle provided in accordance with an embodiment of the invention. The vehicle includes an infeed conveyor 110 and an output conveyor 120 which cooperate to transport bulk material from a distal end 112 of the infeed conveyor to a distal end 122 of the output conveyor. Material is received at the distal end 112 and is conveyed, for example by powered belt conveyor, along the infeed conveyor and off of an output end 114 of the infeed conveyor for receipt, via gravity, by a receiving portion 124 of the output conveyor, either at an end or interior portion thereof. The material is then conveyed by another belt conveyor along the output conveyor and off of the distal end 122 to a target container proximate to the conveyor vehicle. Various forms and types of belt conveyors may be provided. For example, belt conveyors may have a substantially flat or concave cross section, for example a V-shaped or U-Shaped cross section, possibly mounted on corresponding V-shaped or U-shaped roller assemblies. Belt conveyors may include features such as ledges formed across the width of the conveyor to assist in moving bulk material.

Position of the infeed conveyor 110 is adjustable relative to the remainder of the vehicle by use of suitable drive systems. As illustrated, the infeed conveyor 110 is mounted on a powered turntable 135 configured for rotating the infeed conveyor relative to the vehicle. At least one hydraulic cylinder 137, or more typically a pair of hydraulic cylinders located on opposite sides of the conveyor, or similar mechanical actuator is provided for raising and lowering the infeed conveyor. The infeed conveyor may be a telescoping conveyor comprising an upper section 116 movable relative to a lower section 117 under mechanical power of a telescoping drive mechanism such as a rack and pinion mechanism or a hydraulic system. For example, the upper section may be supported overtop of the lower section and generally parallel thereto. With the lower section held in place relative to the vehicle chassis, the upper section may be made to move in a longitudinal direction relative to the lower section, for example on a track, to extend or retract, thereby varying the length of the conveyor. By operating one or more of the turntable 135, the hydraulic cylinder 137 and the telescoping mechanism, the distal end 112 of the infeed conveyor may be placed in a variety of locations within a three-dimensional envelope, relative to the rest of the vehicle.

It is contemplated that, although hydraulic drivers are often referred to herein for operating various mechanical components of the vehicle, other types of mechanical drivers may be utilized. For example, the conveyors may be driven by electric motors, as may other mechanical components.

In some embodiments, the infeed conveyor may be supported by cantilever when receiving material, for example from a gravity-fed material outlet hatch of a truck, rail car, or the like. The hatch may be located on the bottom of a material container and the infeed conveyor may be located upwardly so that an infeed hopper 160 located at the distal end 112 is proximate to the hatch opening, for example to sealingly engage therewith. Such discharge hatches are typically found for example in the belly of a bulk tanker trailer. This may facilitate a reduction in the amount of dust or material loss during receipt of the bulk material at the distal end. Due to the cantilever support, the infeed conveyor and/or hopper need not rest on the ground, and therefore can be made to engage closely with the hatch opening.

Cantilever support may include a suitable counterbalance which may be provided for example by the vehicle weight and support footing geometry, possibly in conjunction with a counterweight designed for this purpose. In some embodiments, counterbalancing may be managed at least in part by the control system. In some embodiments, a locking mechanism or sufficiently robust raising/lowering actuator of the infeed conveyor may be provided to facilitate the cantilever support and holding in place of the conveyor against forces due to receipt of bulk material. For example, a hydraulic lift cylinder may raise the infeed conveyor into place, and a locking mechanism operable at different travel distances of the lift cylinder, such as a ratchet mechanism, may be used to assist in cantilever support of the infeed conveyor in its desired position.

Further, in some embodiments, the infeed hopper may have a height profile which is suitably limited so as to allow for positioning of the hopper between a hatch opening of the material source vehicle and substantially level ground supporting the vehicle. The hopper may be configured in this way given predetermined and possibly standard vehicle clearance heights as would be readily understood by a worker skilled in the art. The hopper may comprise or interact with rigid or flexible sidewalls which form an enclosure around the hatch opening in order to inhibit dust egress during material transfer.

In some embodiments, the conveyors may include top covers for containing dust and bulk material and/or preventing external material or moisture from entering the bulk material.

Figure 1B:
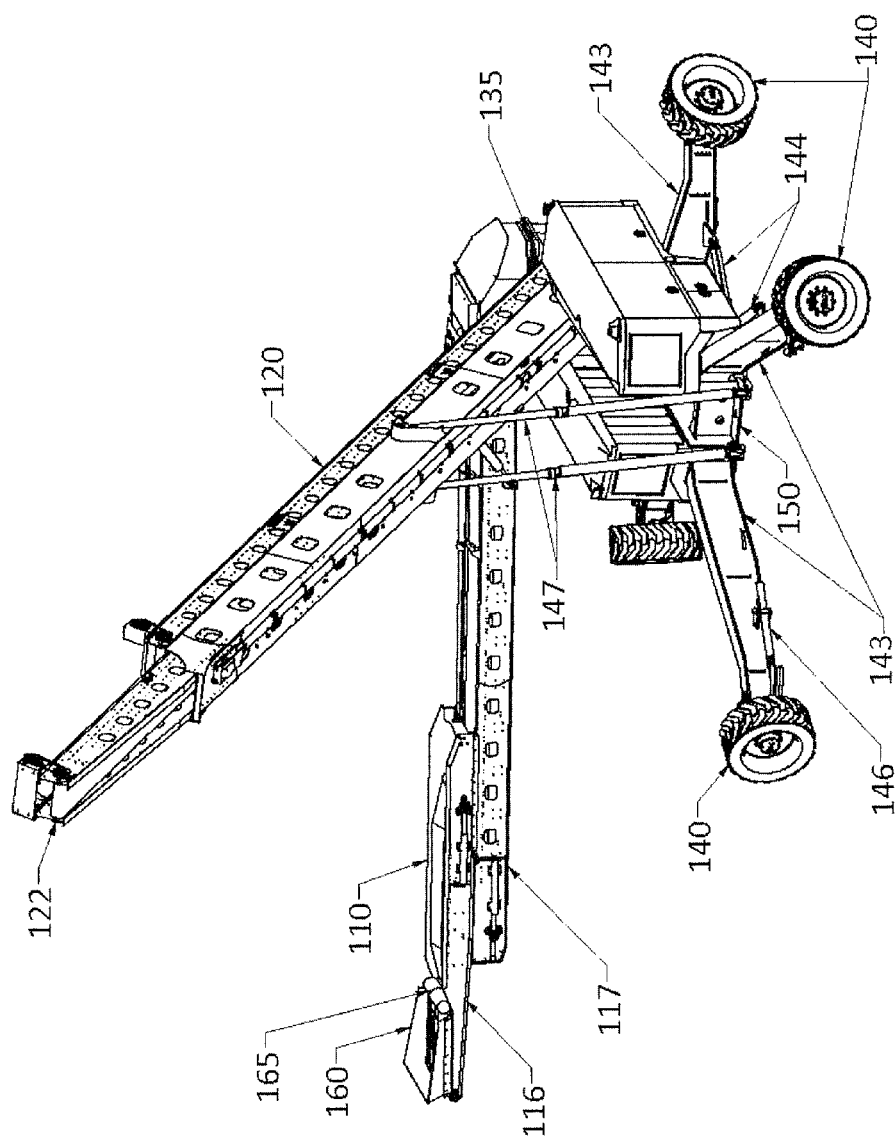

In some embodiments, as illustrated in FIG. 1B, an idler roller 165 is located proximate to the infeed hopper, overtop of the conveyor belt of the infeed conveyor. The idler roller may contact or nearly contact the infeed conveyor during operation, such that bulk material can be interposed between the idler roller and the infeed conveyor, the bulk material being in contact with both the idler roller and the conveyor surface. The idler roller 165 has an axis of rotation parallel to that of the conveyor rollers which facilitate motion of the conveyor. Bulk material on the conveyor passes between the idler roller 165 and the conveyor. This causes the idler roller to generally force the bulk material toward the conveyor, thereby reducing bouncing tendency of the bulk material and assisting in settling the material onto the conveyor for upward conveyance. The bulk material may in some embodiments be compressed by the idler roller, thereby further assisting in settling the material onto the conveyor. Such an idler roller may increase bulk material flow rate on the conveyor, since such material otherwise tends to bounce and churn at the bottom of the conveyor when it initially falls onto the conveyor. The idler roller may optionally further operate to compact the material on the conveyor.

Position of the output conveyor 120 is also adjustable. As illustrated, the output conveyor 120 is non-rotatably mounted to the vehicle chassis 150 rather than being placed on a turntable. That is, in various embodiments, the output conveyor 120 is fixed relative to the vehicle chassis about a vertical rotation axis and does not rotate horizontally with respect to the chassis, i.e. axially about a vertical axis and in the horizontal plane. In such embodiments, horizontal rotation of the output conveyor relative to the operating environment is achieved by rotation of the vehicle by operation of its drive wheels 140, as will be described in more detail below. Each drive wheel is mounted at the end of a corresponding support arm 143, which may be pivotably mounted to the vehicle chassis and driven for example by hydraulic cylinders 144. One or more hydraulic cylinders 147, typically a pair of hydraulic cylinders, or similar mechanical actuator is provided for raising and lowering the output conveyor. The output conveyor may be a telescoping conveyor comprising a distal section 127 movable with respect to a base section 126 under mechanical power of a telescoping mechanism. The distal section 127 may be nested within or suspended below the base section 126, and may be supported and guided via a track, for example. By operating one or more of the drive wheels 140, the hydraulic cylinder 147 and the telescoping mechanism, the distal end 122 of the output conveyor may be placed in a variety of locations within a three-dimensional envelope, for example generally relative to a pivot point of the vehicle. The drive wheels may be pivoted on their support arms for example by operation of hydraulic cylinders 146.

As mentioned above, one or both of the infeed and output conveyors systems may be telescoping. A telescoping conveyor system may comprise two or more belt style conveyors arranged in a cascading fashion, wherein adjacent conveyors are mounted on supports which are relatively movable in a longitudinal direction of the conveyor system, thereby allowing lengthening or shortening of the conveyor system.

Figure 1C:
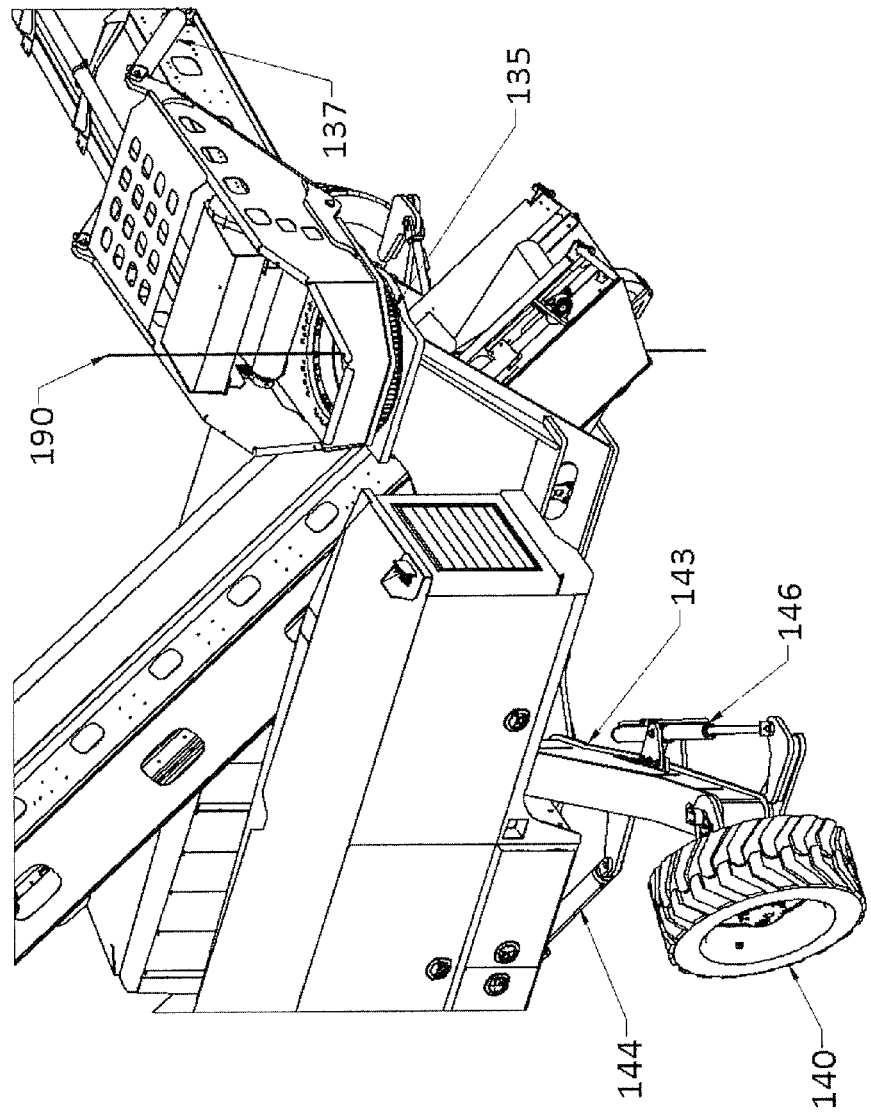

FIG. 1C illustrates a particular vertical axis of rotation 190 about which the vehicle can rotate due to operation of the drive wheels. As illustrated, the axis of rotation 190 passes through or near the center of the turntable 135 of the infeed conveyor. This simplifies operation since the infeed conveyor can be retained in position during vehicle rotation simply by counter-rotating the turntable 135. However, by adjusting the angle of the drive wheels and/or support arms, the location of the axis of rotation 190 can be shifted within a two-dimensional operating envelope. The turntable may connect the infeed conveyor to the vehicle via a slewing bearing such that the infeed conveyor may be rotated, differentially from the discharge section, about an axis in yaw.

As is shown for example in FIG. 1A, the output conveyor 120 includes a lower section 123 on an opposite side of a pivot from the distal end 122. However, in various embodiments this lower section may be excluded, or at least shortened relative to the illustration. In some embodiments, when the distal end 122 of the output conveyor is raised, the lower section 123 is correspondingly lowered since it is on the opposite side of the pivot. The infeed conveyor 110 and the turntable 135 may be mounted directly to the lower section 123. As such, the angle of inclination of the infeed conveyor 110 decreases as the output conveyor is raised. This may allow for decreased energy expenditure for operating the infeed conveyor, for example.

Figure 1D:
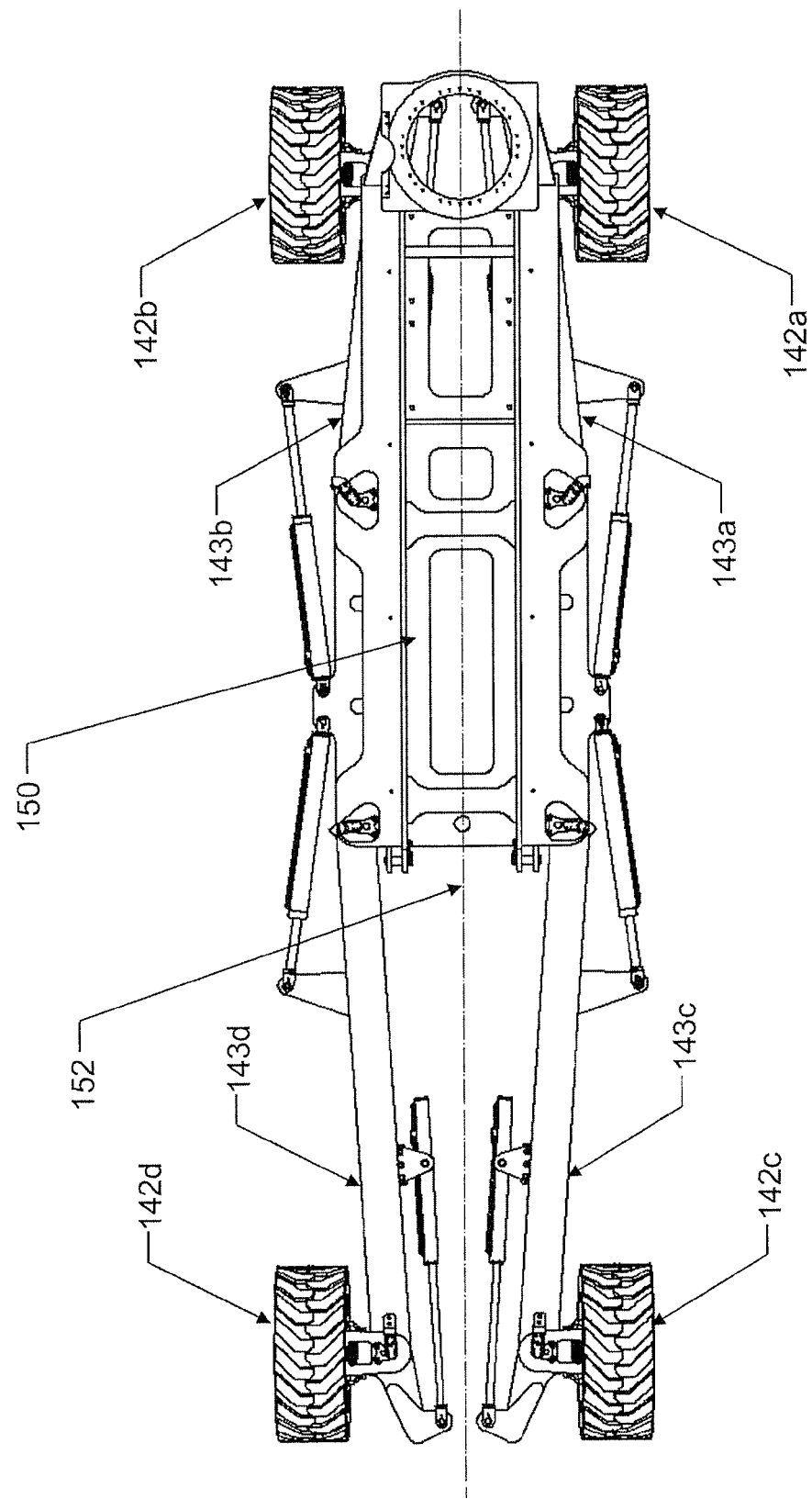

FIG. 1D illustrates the conveyor vehicle with the support arms in a stowed position. In particular, a first pair of the support arms 143c, 143d are oriented proximate to each other forward of the chassis 150 and a second pair of the support arms 143a, 143b are oriented proximate to each other rearward of the chassis 150. This reduces vehicle width for stowage for example on or inside a semi-trailer.

It is noted that, in the stowed configuration the wheels 142a, 142b, 142c, 142d are generally parallel to each other.

Indeed, in some embodiments, the stowed position can potentially also be used as a transportation configuration in which the vehicle is driven generally linearly due to the parallel but still steerable wheels. However, for greater stability, the support arms may be separated from each other somewhat in the transportation configuration, such that the wheels are still orientable substantially parallel to each other for driving the vehicle generally linearly. For example the wheels may be oriented as illustrated in FIG. 1D but with wheels 142a, 142b and wheels 142c, 142d separated pairwise by a greater distance than illustrated in FIG. 1D, such separation achieved by reorientation of the support arms outward from the vehicle midline. In some embodiments, the control system may automatically determine the angular position of the support arms for a given situation. In various embodiments, one or more transportation configurations may be possible, each of which allows the wheels to be orientable parallel to each other and also parallel with one or more given directions relative to the midline 152 of the vehicle, for driving the vehicle in such a given direction. It is noted that the main body of the vehicle does not necessarily need to directly face the direction of travel. Rather, the control system may determine the angle of the main body of the vehicle relative to the direction of travel.

Figure 2:
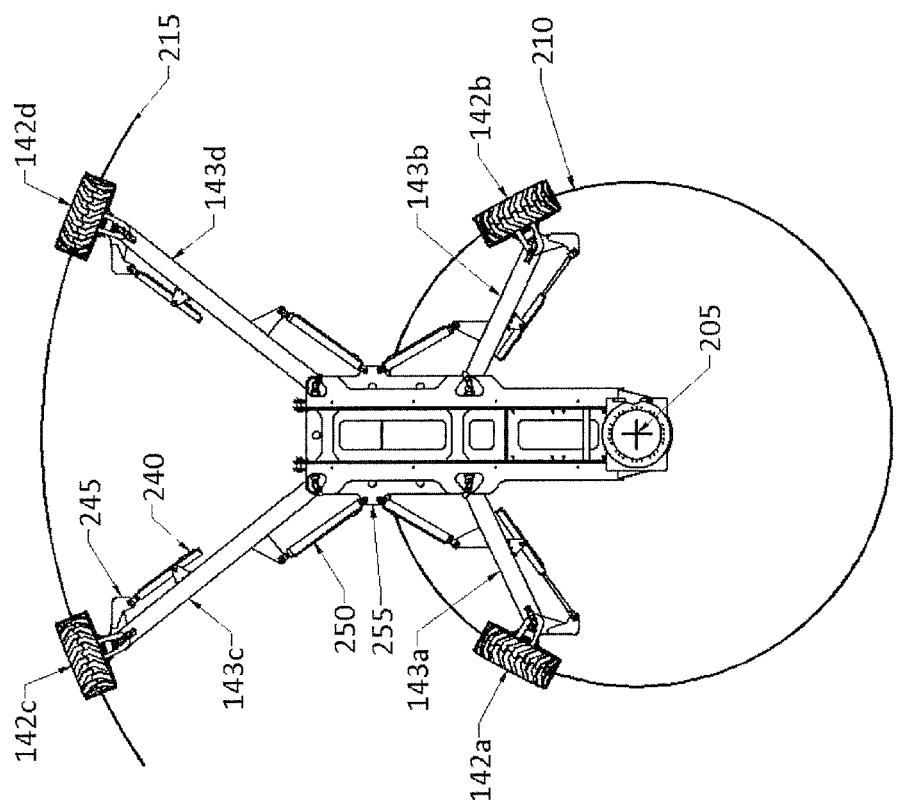
FIG. 2 illustrates a top view of the conveyor vehicle of FIGS. 1A to 1D.

FIG. 2 illustrates a top view of the conveyor vehicle in which the drive wheels are angled for rotation-in-place about a pivot point 205. A first pair of wheels 142a, 142b are angled tangentially with respect to a first circle 210, and a second pair of wheels 142c, 142d are angled tangentially with respect to a second circle 215, both circles having their center at the pivot point 205. As the second circle has a larger circumference than the first circle, the second pair of wheels are generally driven faster than the first pair of wheels during rotation-in-place. By adjusting the angles of all wheels, the position of the circle center and pivot point 205 can be adjusted, allowing the vehicle to be rotated about a selectable pivot point. In various embodiments, each of the wheels may be independently driven at a selected speed and direction, independently steerable, or both.

In some embodiments, the pivot point 205 may be aligned with a pivot point of the infeed conveyor's supporting turntable. This may simplify operation, for example by maintaining the distal end 112 of the infeed conveyor in place while rotating the vehicle about the pivot point 205 by counter-rotating the turntable at the same angular speed but opposite angular direction as rotation of the vehicle.

In various embodiments, steering of each wheel may be performed by adjusting the angle of the corresponding wheel 142a, 142b, 142c, 142d relative to the current position of its support arm, the wheels mounted on a wheel assembly which in turn is pivotably mounted to the support arms. In some cases steering may also be performed in part by adjusting the angle of the corresponding pivotably mounted support arm 143a, 143b, 143c, 143d relative to the vehicle chassis. Pivoting of the support arms and/or wheels may be performed by mechanical drivers such as hydraulic cylinders, gear systems, or the like. By pivoting both the wheel and support arm, a potentially greater angular steering range may be obtained.

In some embodiments, for example as illustrated in FIG. 2, a hydraulic cylinder 240 is coupled at one end to the support arm 143c and at the other end to a steering knuckle 245 mounted on a wheel assembly. Driving of the steering knuckle by the hydraulic cylinder causes pivoting of the wheel assembly for steering. Further, another hydraulic cylinder 250 is coupled at one end to the chassis 255 and at the other end to the support arm 143c or protrusion thereof, such that driving of this hydraulic cylinder causes pivoting of the corresponding support arm. This arrangement can be provided for each wheel and support arm. As illustrated, the wheel assemblies are capable of pivoting over an angle of about 110 degrees, and the support arms are capable of pivoting over angles of at least about 30 degrees. These angular ranges may be adjusted by adjusting the length and position of the hydraulic cylinders and their mounting points, and/or by removing portions of the chassis which may impede further motion of the support arms.

It is noted that, in some embodiments the vehicle may only require wheels pivotable relative to the support arms or support arms pivotable relative to the chassis, but not necessarily both, in order to achieve rotation such as rotation-in-place. However, use of both pivotable wheels and pivotable support arms may confer certain advantages, such as range of control, flexibility of vehicle operation, adjustable vehicle stability, and the like, as described elsewhere herein. The support arms may be of similar or different lengths and mounted at various relative locations.

In some embodiments, independent driving of each wheel may be facilitated by providing a wheel drive gear assembly interposed between the wheel hub and the steering knuckle. The gear assembly comprises a first face coupled to the wheel hub and a second fact coupled to the steering knuckle, the first and second faces rotatable with respect to each other and driven by a hydraulic motor. When the hydraulic motor delivers power to the gear assembly, the assembly operates to turn the wheel at a given speed, which is generally variable.

While the above embodiment utilizes a turntable for positioning the infeed conveyor and a four-wheel steering configuration for positioning the output conveyor, it is appreciated that, in some embodiments, the opposite configuration may also be used, i.e. utilizing a turntable for positioning the output conveyor and a four-wheel steering configuration for positioning the infeed conveyor, the infeed conveyor being non-rotatable with respect to the chassis.

In various embodiments, in addition to facilitating rotation of the vehicle, the wheels and/or support arms are further configured for transporting the vehicle from place to place. For this purpose, the wheels may be aligned so that they are generally parallel to each other and steered in a conventional two-wheel or four-wheel steering manner. Depending on the range of pivoting motion of the wheels and support arms, the support arms may be placed in a variety of angular configurations while allowing the wheels to be aligned generally parallel. For example, if the support arm mounting points define the four corners of a rectangle, and 90 degree pivotability of both the wheels and the support arms can be achieved, then a range of such transportation configurations may be achievable, along a continuum from one extreme in which all support arms are parallel to the long side of the rectangle to another extreme in which all support arms are parallel to the short side of the rectangle. In some embodiments, the support arms may be folded against the chassis, thereby reducing the footprint of the vehicle for compact stowage thereof.

By positioning the support arms at a particular set of angles (for example about 45 degrees) relative to the chassis, the separation between the wheels, or the area defined by a shape having the wheels as vertices, can be increased or even maximized, thereby providing for a relatively wide support base for the vehicle and correspondingly high stability. This may be particularly useful during material conveyance.

In various embodiments, the support arms may be positioned by the control system such that the wheels are separated from the pivot point by at least a threshold distance, and possibly by a substantially maximum achievable distance. This may provide for increased rotational position control. For example, given a circle centered on the pivot point and along which one or more of the wheels travels for vehicle rotation, as the diameter of this circle increases, one turn of the wheel corresponds to a smaller angular rotation of the vehicle, and hence for a limited granularity of control over wheel rotation, more accurate angular position can be achieved for a larger diameter circle. Furthermore, steering of the wheel can be more accurately achieved when following a larger circle than when following a smaller circle, due to the difficulty of tracking a more quickly varying curvature of the smaller circle. The control system may be configured to balance the wheel separation requirement with other requirements such as footprint limits and stability.

In various embodiments and scenarios, since the support arms rotate along with the output conveyor, the vehicle remains at substantially the same level of stability regardless of where the output conveyor is positioned. That is, the position of the base, i.e. the ground-contacting points, of the vehicle is substantially unchanged relative to the position of the output conveyor during rotation of the output conveyor. Hence, if the vehicle's center of gravity is dictated in large part by the vehicle body and output conveyor (relative to that portion dictated by the position of the infeed conveyor), then, at least on level ground, said center of gravity essentially does not move relative to the vehicle's wheels during rotation of the output conveyor. In contrast, if the vehicle chassis were to remain in place and the output conveyor rotated via turntable, a relatively larger counterweight would be required for the output conveyor, and stability may potentially vary with rotation if the wheels of the vehicle are arranged in a rectangular layout. Therefore, embodiments of the present invention provide for an alternative approach to supporting a rotatable portion of a vehicle which has a center of gravity which travels through a significant arc.

Mechanically driven components of the vehicle may include various elements such as the wheels, wheel steering actuators, support arm pivoting actuators, conveyor turntables, conveyor telescoping mechanisms, conveyor raising and lowering actuators, conveyor belt drive means, and the like. In accordance with embodiments of the present invention, a control system is configured to controllably actuate each of these mechanically driven components. In some embodiments, some or all of the components may be actuated independently. For example, the wheels may be independently steerable and drivable at independently selected speed. In some embodiments, some of the components may be actuated in combination, for example via either a mechanical linkage or via coordinated control of independently driven elements. The control system may be configured to actuate various components in order to drive a component to a specified linear or angular position, effect a specified change in linear or angular position, drive a component at a specified linear or angular speed and direction, or the like, or a combination thereof.

In accordance with embodiments of the present invention, a system of sensors is provided and operatively coupled to some or all of the mechanically driven components of the vehicle. These may include angular or linear position sensors, angular or linear velocity sensors, or the like, or a combination thereof. For example, sensors may monitor the angular position of the wheels, the angular position of the turntable or turntables, the three-dimensional positions and angles of the conveyors, the length and speed of the conveyors, and the like. Sensors generally provide positional feedback to the control system, and may include linear encoders, rotary encoders, displacement sensors, or the like.

In some embodiments, the current overall position and/or orientation of the vehicle, relative to a reference position and/or orientation can be tracked by use of appropriate sensors. For example, location of the vehicle at a worksite may be tracked by a local positioning system (LPS) in which the vehicle can be located with reference to on-site positioning beacons. By positioning a pair of points on the vehicle using LPS, vehicle orientation can also be determined. Relative vehicle position and/or orientation may additionally or alternatively be determined using dead-reckoning, based on tracking a history of wheel and outrigger movements. Dead-reckoning and LPS may be used in combination to improve location accuracy.

In some embodiments, one or more weight sensors may be provided for monitoring load of granular material currently on the vehicle conveyors. In some embodiments, measurements from the weight sensors may be used in conjunction with measurements of conveyor length and conveyor velocity in order to track an amount of granular material handled by the conveyor over a predetermined time interval. It is further noted that granular material may "bounce back" or "roll back" when travelling upward on a conveyor or accelerating during conveyance, and this may lead to measurement errors in the amount of material conveyed. In one embodiment, such errors may be corrected by applying a correction factor indicative of an expected amount of bounce or roll back of material. The correction factor may be adjusted based on an angle of elevation of the conveyor, for example. Correction factors may be determined based on suitably designed tests or simulations for example. In another embodiment, the amount of material placed onto the conveyor and removed from the conveyor may be measured directly by weight sensors on the adjacent material source and material storage container. The amount of bounce or roll back of material may then be inferred from the various other measurements if desired.

In some embodiments, material weight sensors may comprise load sensors operatively coupled to the conveyor drive motor. After suitable calibration, by measuring the amount of power delivered by the drive motor, along with the conveyor speed and angle of inclination, the weight of material on the conveyor can be inferred. In some embodiments, material weight sensors may comprise sensors operatively coupled to the hydraulics holding the cantilevered conveyors in place, these sensors being configured to determine the amount of force required by the hydraulics to support the conveyors and thereby infer the weight of material placed thereon. Other types of weight sensors may also be used.

Material Handling and Storage System

In various embodiments, the conveyor vehicle generally forms part of a larger material handling and storage system. The system comprises one or more mobile material sources such as trucks or rail cars which unload granular material through a hatch onto the infeed conveyor of the conveyor vehicle. The system further comprises one or more elevated material storage containers into which the output conveyor of the conveyor vehicle discharges the granular material via one or more hatches on the containers.

Figure 6:
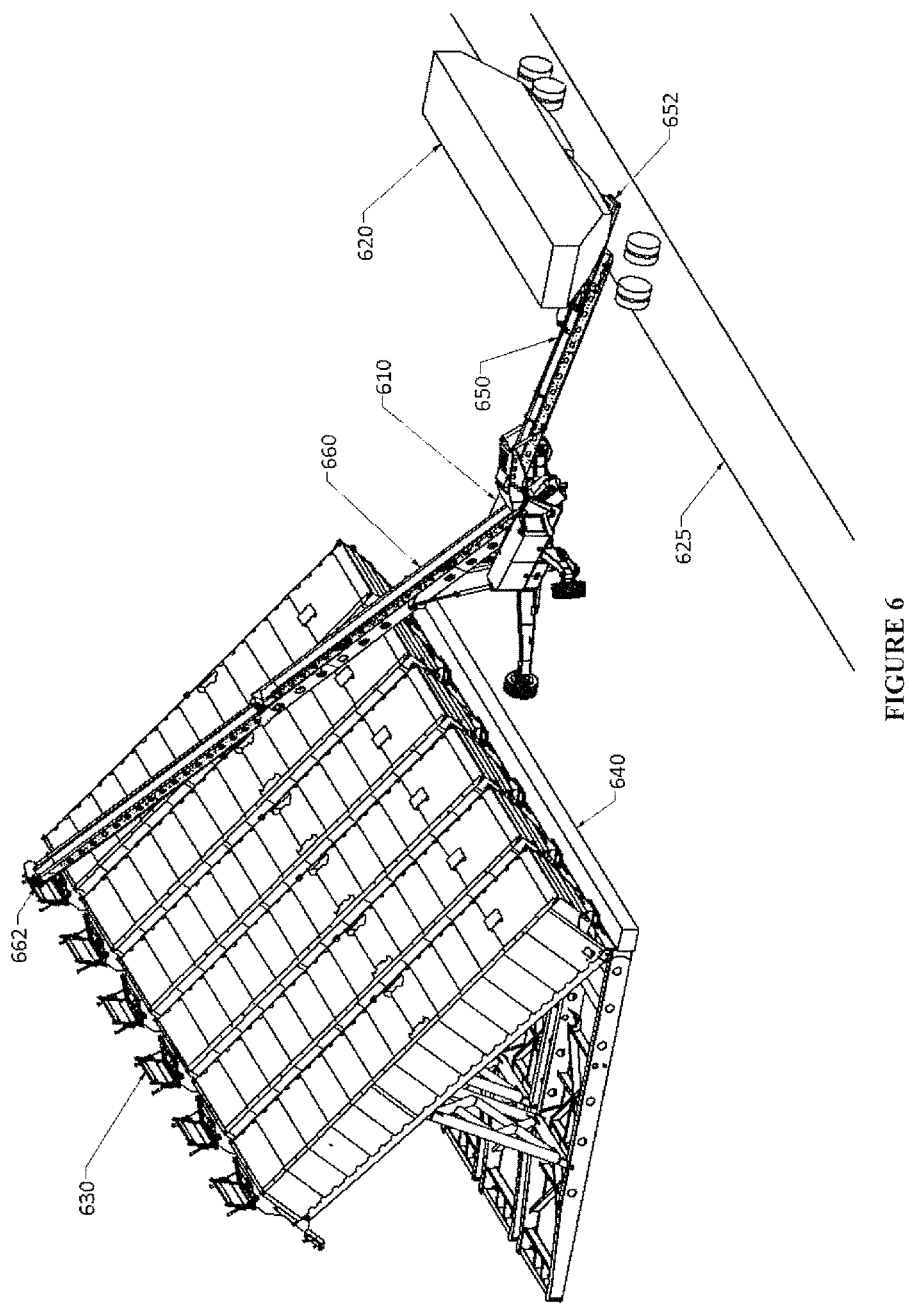
FIG. 6 illustrates a bulk material delivery, handling and storage system comprising a mobile conveyor vehicle provided in accordance with one embodiment of the invention.

FIG. 6 illustrates a system comprising a mobile conveyor vehicle 610 as described herein, receiving bulk material from a delivery truck 620 and conveying the material to one of a plurality of elevated storage containers 630. The system may be mobile and set up for substantially temporary use in a remote location, such as a hydraulic fracturing site. The delivery truck 620 may be located at a delivery point located along a suitably placed vehicle-accessible road or path 625. The storage containers 630 may be arranged for example along a line adjacent to a conveyor 640 which receives material from the storage containers as needed for example to facilitate hydraulic fracturing operations. The system may integrate various components of a SandStorm™ material handling system provided by TyCrop™, for example with the storage containers 630 corresponding to GravityBox™ containers as also provided by TyCrop™. In some embodiments, the storage containers may include multiple hatches for receiving material at different locations. The conveyor vehicle may be configured to position the endpoints 652, 662 of its infeed conveyor 650 and output conveyor 660, respectively, so as to receive material from an output hatch of the delivery truck 620 and deliver it to a selected one of the storage containers 630. Positioning the conveyor endpoints 652, 662 may comprise rotating the conveyors, telescoping the conveyors, elevating or lowering the conveyors, and optionally moving the vehicle itself from one location to another. In some embodiments, the vehicle 610 may be placed at an alternate location on the opposite side of the line of storage containers. The output conveyor endpoint 662 may be capable of traversing roughly in an arc and of extending such that it can discharge into a selected one of the storage containers 630, preferably without relocation of the vehicle or containers. In one embodiment, the output conveyor is extendable by about 46 feet and capable of elevation of up to about 56 feet.

In some embodiments, the output conveyor endpoint 662 may also be capable of discharging at extended minimum and maximum reach into low elevation devices such as industrial sand conveyors, blenders, bulk tankers, and ground-level stockpiles, and the like. Discharging into bulk tankers may be desirable for excess material removal upon job completion.

In some embodiments, the conveyor vehicle may include sensors configured to automatically detect some or all of the hatches of the material sources and material storage containers. Suitable sensors may include machine vision sensors such as cameras, electrical, magnetic or radiofrequency (RF) sensors, or the like. In some embodiments, the hatches may have a beacon mounted proximate thereto for detection by the sensor, such as a light, radio transmitter, or the like. The beacon may be configured to emit a signature which is detectable and recognizable by one or more of the sensors. For example, the beacon may repeatedly transmit a predetermined light pattern or radio signal pattern. Beacons may be part of an LPS system. In other embodiments, for example when the machine vision sensor is capable of detecting the location of a hatch by its optically detected shape, such beacons may potentially be omitted. Sensors generally comprise a detection component, such as a camera, radio receiver, or the like, as well as computing components such as a microprocessor or other digital circuit configured to process signals from the detection component in order to recognize signal signatures which are indicative of the presence, proximity and/or location of a hatch or other object of interest to be sensed.

In some embodiments, sensors may be capable primarily of detecting proximity of an object of interest. By moving the sensor by a known amount in a known direction and measuring a change in proximity, the object of interest can be located using triangulation or trilateration based on the plural sensor readings. Alternatively, plural such sensors may be used to obtain the plural sensor readings concurrently. In other embodiments, sensors may be capable of directly detecting two-dimensional or three-dimensional relative location of an object of interest within the sensor's field of view, for example by analysis of a camera image.

Embodiments of the present invention utilize the sensors and optionally the corresponding beacons for facilitating alignment of the conveyor infeed and/or output ends with and proximate to the appropriate hatches. In one embodiment, the control system may utilize sensor input to track hatch location and actuate various mechanically driven components of the vehicle so as to guide the conveyor ends into place. In another embodiment, the control system may use sensor input to track and display hatch location on an operator interface to assist the operator in guiding the conveyor ends into place by manipulating the vehicle controls. Beacons may be mounted proximate to relevant features to be detected, such as material hatches.

In some embodiments, a common operator interface may be used to control the conveyor vehicle and other components of the material handling and storage system, such as aperture size of material sources feeding material to the vehicle and material destination hatches receiving material from the vehicle. Readings from weight or volume sensors of material sources and destinations may be provided to the common operator interface.

Control System

Various embodiments of the present invention relate to a control system which is configured to receive input from an operator interface and from various sensors of the conveyor vehicle, process the input, and provide output to the operator interface as well as control signals for driving the various mechanically driven components of the vehicle. The operator interface may optionally comprise a remote control operator interface operatively coupled to the vehicle control centre via a wireless radio communication link.

For example, the operator interface may comprise a portable control unit including joystick controls and buttons, or a tablet-style device including a keypad or touchscreen input. Indicators of vehicle state can be displayed via a video monitor, indicator lights, or the like, mounted on the operator interface.

As would be readily understood by a worker skilled in the art, the control system may be an electronic control system such as a computer system, microcontroller system, or other collection of electronic components and interface components such as electrical and/or electromechanical transducers and actuators. The control system may comprise a computer for executing instructions stored in memory operatively coupled thereto. The control system may interface with various sensors, actuators and operator input and output interfaces using components such as digital-to-analog and analog-to-digital converters, data buses, wired or radio interfaces, and the like.

Various embodiments of the present invention are configured to provide a level of automation of the conveyor vehicle and possibly other components of the system, such that the vehicle and/or system can be operated by a limited number of operators, for example one or two operators. This can be accomplished for example by automating or partially automating motion control of the vehicle components. In addition, optimization and/or decision routines may be provided which automatically determine or suggest operating parameters such as an optimal vehicle pose or container load/unload sequence, thereby reducing planning time and demands placed on the operators.

In some embodiments, the control system may be configured to provide one or more of a plurality of degrees of vehicle automation. For example, in a fully automatic mode, the control system may be configured to automatically select and locate a material source hatch and a material destination hatch, compute a control solution for positioning the vehicle appropriately for conveying material from the material source hatch to the material destination hatch, execute the control solution, and convey the material from source to destination automatically. In a partially automatic mode, the control system may accept operator input indicative of various parameters, such as selection of a desired material source and/or material destination, vehicle position, desired conveyor slope, material transfer rate, or the like, or a combination thereof. A control solution respecting the operator input parameters may then be computed. Subsequently, the vehicle may be maneuvered into position corresponding with the control solution automatically or partially automatically under continuing operator input. Subsequently, material transfer can begin either automatically or partially automatically.

In various embodiments, material flow rate may be a time average flow rate, for example averaged over a predetermined or selected time interval. Material flow rate may be optimized by accounting for reconfiguration time between vehicle positions, conveyor slope, conveyor length, and the like. For example, to increase material flow rate, the time spent performing vehicle repositioning and reposing events should be reduced. Thus, efficient movements between material input and output hatches should generally be utilized. Further, it is recognized that, as conveyor lengths reduce, material transfer rate tends to increase due to reduced travel distance, but also tends to decrease due to increased upward conveyor slope and resultant material fallback. Therefore, in some embodiments an optimal conveyor length may be calculated which maximizes material flow rate based on this consideration, for given three-dimensional material input and output locations, generally considering that input is lower than the output. In some embodiments, repositioning time and overall conveyor length may be optimized together. In some embodiments, a conveyor may be lengthened during material transfer, in order to reduce repositioning time.

In some embodiments, vehicle pose, such as outrigger position, infeed and output conveyor positions and heights, and the like, may be configured by the control system to provide for a predetermined amount of stability during operation. For example, the two conveyors may be located and extended so as to sufficiently counterbalance each other with a given margin while subject to a given range of material loads. Counterbalancing poses may be calculated which are effective for one or a variety of loaded and/or unloaded configurations of the conveyors. Outriggers may also be positioned to compensate for potential vehicle imbalances, for example given a particular conveyor arrangement.

In some embodiments, the control system may be configured to avoid extreme vehicle poses, such as conveyor extensions or retractions, or conveyor angular positions or tilts, which are close to physical operating limits. As such, a predetermined reserve amount of adjustment may be available for responding to unanticipated situations or adjustments.

In some embodiments, the control system may be configured to record and playback vehicle movements initiated via operator input. For example, an operator may input a command to initiate recording of vehicle movements, at which point the control system commences storing, in computer memory, the operator commands and associated time stamps, optionally along with a sequence of sampled vehicle positions, orientations and poses derived from position sensor input, again with associated time stamps. Recording may then be stopped by operator input of a second command. Subsequently, when the operator inputs a command to play back a selected recorded movement, or playback of the recorded movement is automatically triggered during execution of a control program routine, the control system automatically guides the vehicle to the initial recorded vehicle position, orientation and pose and then mimics the recorded movement based on the recorded commands and/or sampled vehicle positions, orientations and poses.

In some embodiments, the control system may be configured to record one or a sequence of vehicle positions, orientations and poses and automatically revert to such recorded positions, orientations and poses upon command or upon a predetermined trigger being provided to the control system. For example, when the vehicle is in a particular position, orientation and pose, and the control system is triggered to record same, for example in response to a condition such as proximity to a material hatch or receipt of an appropriate operator input, the control system may read and store in memory the sensor readings indicative of various poses of vehicle components, such as wheel angle, outrigger angle, conveyor angle, turntable angle, conveyor extension, and the like, as well as position coordinates within a worksite, such as LPS coordinates. When a command is received to revert to a recorded position, the control system may be configured to calculate and execute a control solution which guides the vehicle from its current position to the recorded position. In some embodiments, the control system may be configured to guide the vehicle through a sequence of recorded positions, for example including waypoints and a final position. Waypoints may be used to avoid known obstacles and more finely control how the vehicle is guided to the final position.

In various embodiments, computing the control solution comprises determining a conveyor vehicle position, orientation and pose which satisfies various control objectives. The vehicle position may refer to its location on the ground, the orientation may refer to the angle at which the vehicle sits on the ground, relative to a given reference system, and the vehicle pose may refer to the orientation, elevation angle and extension of the conveyors, outriggers and/or other movable components relative to the vehicle. The control solution generally satisfies the requirement of positioning the infeed and output conveyor endpoints so that they can receive and provide material from and to desired locations in three-dimensional space, respectively. However the control solution may be computed in order to satisfy one or more constraints, such as a range of angles of inclination of the conveyors, a range of lengths of the conveyors, direction changes of material due to transfer between the infeed and output conveyors, a limitation on allowable vehicle positions, an amount of material to move and/or rate of material transfer, a load presented to one or more vehicle components, and the like.

In some embodiments, the control system may compute a control solution by solving a constrained optimization problem using computational techniques such as linear or non-linear programming. For example, given an initial vehicle position, orientation and pose (represented by a point in a multidimensional coordinate system representing the combined state of the vehicle's mechanical components), a desired final position of the conveyor infeed and output ends, and a set of constraints on allowed vehicle position, orientation and pose, the control solution may be computed as a schedule of commands for moving the various vehicle mechanical components to a final vehicle position which effects the desired final position of the conveyor infeed and output ends while also being "closest" (in terms of the coordinate system representation) to the initial vehicle position.

In some embodiments, a plurality of material source hatches and/or a plurality of material destination hatches are provided, and computing the control solution comprises selecting one or a sequence of the material source and destination hatches. For example, the computation may select the emptiest material source or destination for unloading/loading first, or selecting the material source and/or destination in order of which can be reached most efficiently from the current vehicle position, orientation and pose, or the like. In some embodiments, order of arrival of container vehicles is a factor in determining order of unloading. Selection may be based on a combination of factors, for example by assigning component scores indicative of certain features such as material container emptiness or closeness, computing, for each container an overall score based on a weighted combination of its component scores, and selecting material containers in order based on the overall scores.

In some embodiments, the control solution is computed with regard not only to a desired final position, orientation and pose of the vehicle, but also with regard to the vehicle movements required to reach the desired final position, orientation and pose.

In some embodiments, the rate of material flow is controlled for example by control of conveyor speeds and/or control of material source hatch aperture size. Overload conditions in which excessive weight or volume of material on the conveyors may be detected and mitigated for example by reducing the material source hatch aperture size and/or increasing one or more of the conveyor speeds to clear excess material. Conveyor slope may be reduced to inhibit material fallback if necessary, with conveyor length being concurrently increased to maintain constant an overall vertical distance between material input and output. Buildup of material at various points may also be monitored, for example at the beginning of the infeed conveyor or output conveyor, or by monitoring for imbalances between amounts of materials taken from material sources and amounts provided to material destinations, for example by comparing weight measurements at sources and destinations. In one embodiment, the output conveyor speed may be increased in response to material buildup at the beginning thereof. The output conveyor may be initially run at less than maximum speed, in order to allow for such response in case of material buildup. An operator alert may be issued if the output conveyor is running substantially at its maximum speed.

In some embodiments, control solutions are computed accounting for dust control, that is to control the amount of dust emitted during material conveyance. For example, the conveyor slope, speed and length may be adjusted to reduce dust emission. Relationships between vehicle pose and dust emission may be provided as operating parameters, for example.

In some embodiment, control solutions may be provided which decrease conveyor slope angle, for example by increasing the length of one or both of the telescoping conveyors. In order to appropriately position the conveyor endpoints when the conveyor lengths are increased, the control solution may specify that the vehicle is moved to an appropriate position away from the line connecting the desired conveyor endpoints. This facilitates longer conveyor lengths and hence shallower inclines while allowing material to be transferred between potentially closely positioned material outlet and inlet hatches. However, this configuration also results in an increased direction change of the material when passing from the infeed conveyor to the output conveyor, and the control solution may be configured to balance these two considerations. When one of the conveyors is rotationally fixed to the vehicle chassis, the chassis may be rotated and moved simultaneously, for example via independently steering and driving each of the vehicle wheels in an appropriate manner.

In various embodiments, the control system may be configured to operate the vehicle in part by executing a predetermined set of program instructions including routines, condition evaluation, conditional branches, and the like. Triggers corresponding to predetermined sensor conditions may be used to initiate certain routines such as computation or vehicle motion control routines. Operator input may be used to initiate, guide and/or manage automatic operation of the control system.

Figure 3:
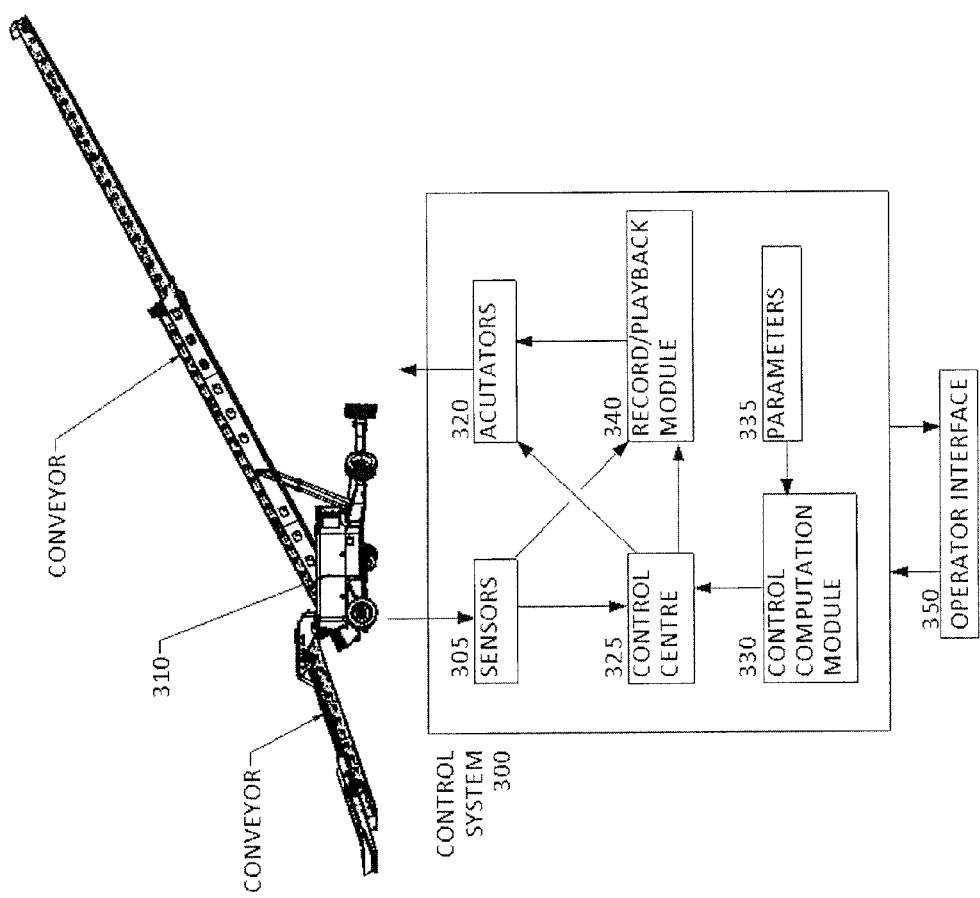
FIG. 3 illustrates a control system provided in accordance with embodiments of the present invention.

FIG. 3 illustrates a control system 300 provided in accordance with embodiments of the present invention. The control system comprises a plurality of sensors 305 which may be mounted at various locations on the material transfer vehicle 310, and a plurality of actuators 320 for driving various mechanical components of the vehicle 310. Sensors may include one or more of: wheel speed sensors, wheel steering angle sensors, outrigger pivot angle sensors, turntable rotary position sensors, conveyor elevation sensors, conveyor speed sensors, material weight sensors, hatch aperture size sensors, hatch proximity sensors, and LPS sensors for specifying position and orientation of the vehicle. Actuators may be capable of controlling one or more of: individual or collective wheel speed, individual or collective wheel steering angle, outrigger pivot angle, turntable rotary position, conveyor elevations, conveyor speeds, hatch aperture sizes, and the like.

The control system may be capable of sensing and/or controlling elements of the system, rather than just the vehicle. For example, hatch apertures are not specifically mounted on the vehicle but rather are located on containers from or to which material is transferred.

The control system further comprises a control centre 325 which is operatively coupled to the sensors 305 and the actuators 320. The control centre 325 is configured to receive electronic signals from the sensors indicative of various sensed conditions and to transmit messages for interpretation by the actuators 320 which drive vehicle components accordingly. The control centre may be configured to execute predetermined control routines and/or facilitate operator control. The control centre may comprise a computer, microcontroller, microprocessor, or the like, which executes software or firmware instructions in order to execute control routines, as would be readily understood by a worker skilled in the art.

The control system 300 further comprises a computation module 330 which may be used to compute control routines for execution by the control centre 325. Computation may comprise determining an optimal or adequate series of vehicle movements based on parameters 335 stored in computer memory and indicative of vehicle characteristics, user input, desired objectives, physical and temporal constraints, sensor input, and the like. The computation module may also comprise a computer, microcontroller, microprocessor, or the like, which executes software or firmware instructions in order to execute control routines, as would be readily understood by a worker skilled in the art.

The control system further comprises a movement record and playback module 340 which is configured to facilitate vehicle movement recording and playback. In one embodiment, in a recording mode, the module intercepts and records time-stamped samples of sensor 305 readings as well as commands sent from the control centre 325 to the actuators 320. The recorded commands may later be played back and again transmitted to the actuators 320 in order to repeat the previously recorded vehicle movements. Sensor readings may be monitored during playback and commands may be adjusted in order to closely track the previously recorded sensor readings. Thus, the recorded commands may be adjusted during playback in order to more closely track the recorded samples of vehicle position, orientation and pose. Alternatively, in the recording mode, the module may intercept and record sampled sensor 305 readings, and in the playback mode the module may drive the control system to track these sampled sensor readings to repeat the movements by computing a sequence of commands which substantially minimize the difference between the actual sensor readings and the sampled sensor readings over time. The computation module 330 or predetermined feedback control/regulation algorithm may be implemented in order to cause the vehicle to adequately track recorded samples.

The control system further comprises an operator interface 350 which is configured to receive operator input indicative of desired vehicle movements, constraints, parameters, and the like, as well as display vehicle operating conditions to the operator. The operator interface may be used to implement predetermined control routines, control the vehicle directly, initiate computation of a control solution, or the like.

Figure 4:
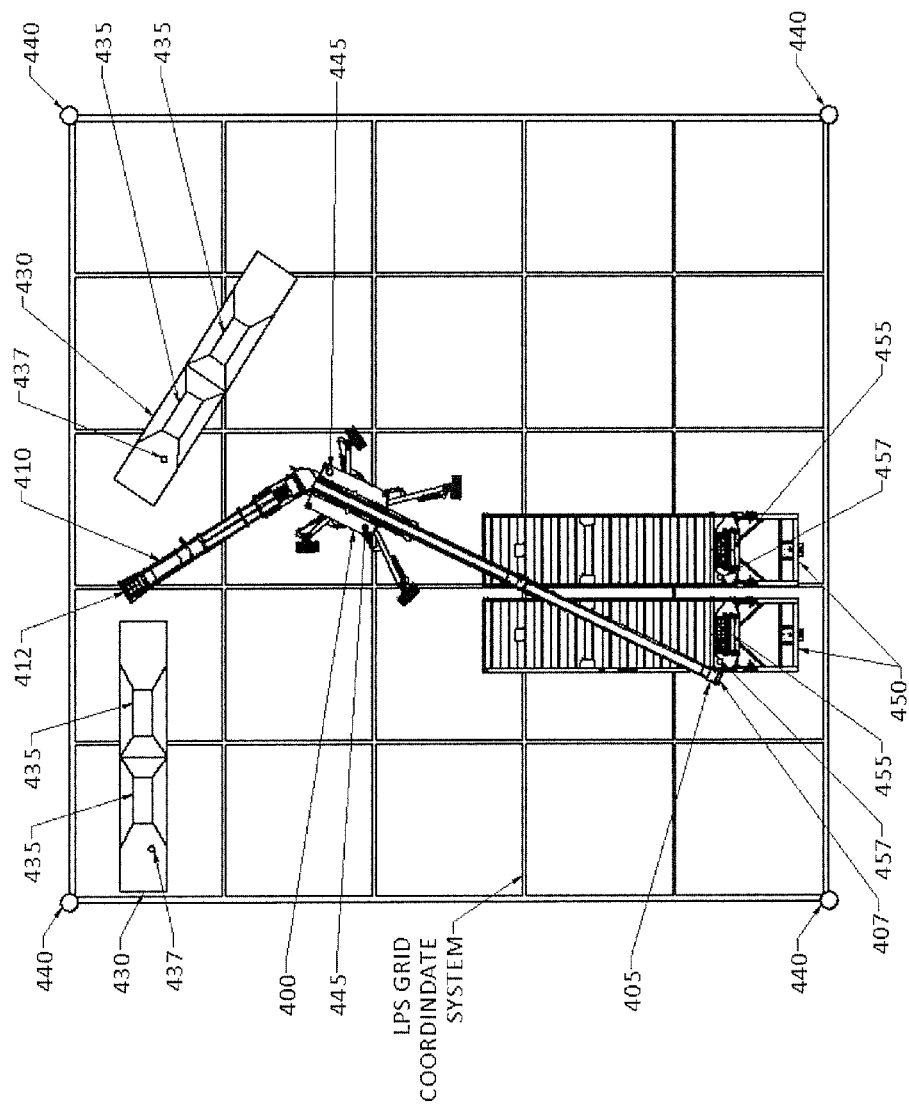
FIG. 4 illustrates a system comprising a conveyor vehicle, in accordance with embodiments of the present invention.

FIG. 4 illustrates a system provided in accordance with some embodiments of the present invention, comprising a material handling conveyor vehicle 400, a set of elevated material storage containers 450, a set of material delivery container vehicles 430, and a plurality of Local Positioning System (LPS) beacons 440. Each of the material storage containers 450 comprises a hatch 455 for receiving material from an output conveyor 405 of the vehicle 400, and a beacon 457 adjacent to or integral with the hatch 455. Similarly, each of the material delivery vehicles 430 comprises a hatch (which may refer to a chute) 435 for dispensing material onto an infeed conveyor 410 of the vehicle 400, and a beacon 437 adjacent to or integral with the hatch or chute 435.

The vehicle 400 comprises a first sensor 407 mounted at or near an output end of the output conveyor 405 and a second sensor 412 mounted at or near an input end of the infeed conveyor 410. Each of the first and second sensors may be arrays of plural sensors. The first sensor 407 is configured to detect location and/or proximity of the beacons 457 and thereby facilitate location of the hatches 455. Different beacons may emit different signatures and the first sensor 407 may be capable of discriminating between signatures in order to discriminate one hatch from another. Based on readings from the first sensor, the output end of the output conveyor 405 may be positioned to dispense material into a desired hatch 455. The second sensor 412 is configured to detect location and/or proximity of the beacons 437 and thereby facilitate location of the hatches or chutes 435. Different beacons may emit different signatures and the second sensor 412 may be capable of discriminating between signatures in order to discriminate one hatch or chute from another. Based on readings from the second sensor, the input end of the infeed conveyor 410 may be positioned to receive material from a desired hatch or chute 435.

The vehicle comprises one or possibly a plurality of LPS sensors 445. The LPS sensors are configured to detect relative location of the LPS beacons and thereby determine location of the vehicle, more particularly the sensors, in a local coordinate system. By using plural LPS sensors mounted at known locations on the vehicle the orientation of the vehicle may also be determined. For example if a first sensor is located on the "front left" corner of the vehicle chassis, a second sensor is located on the "rear right" corner of the vehicle chassis, then the nominal position of the vehicle can be defined as the midpoint of a first line segment connecting the two sensors, or another suitable point, while the angular orientation of the vehicle's front-to-rear midline, with respect to the ground, can be defined by first determining the angle of the first line segment relative to a reference axis of a local coordinate system, and then adding a correction factor which is the (unchanging) angular difference between the first line segment and the vehicle's midline.

Operation of suitable LPS systems would be readily understood by a worker skilled in the art. For example, an LPS sensor may analyze received beacon signals in order to estimate direction and/or distance to each beacon. Triangulation and/or trilateration may then be used to determine coordinates of the sensor in a local coordinate system defined by placement of the beacons.

Alternatively, LPS beacons may be mounted on the vehicle and LPS sensors may be located elsewhere in the work area. The LPS sensors may detect location of the LPS beacons and transmit this information back to the control system for facilitating tracking of position and/or orientation of the vehicle.

Example Control System Processes

FIGS. 5A to 5E illustrate various control system processes provided in accordance with certain embodiments of the present invention.

Figure 5A:
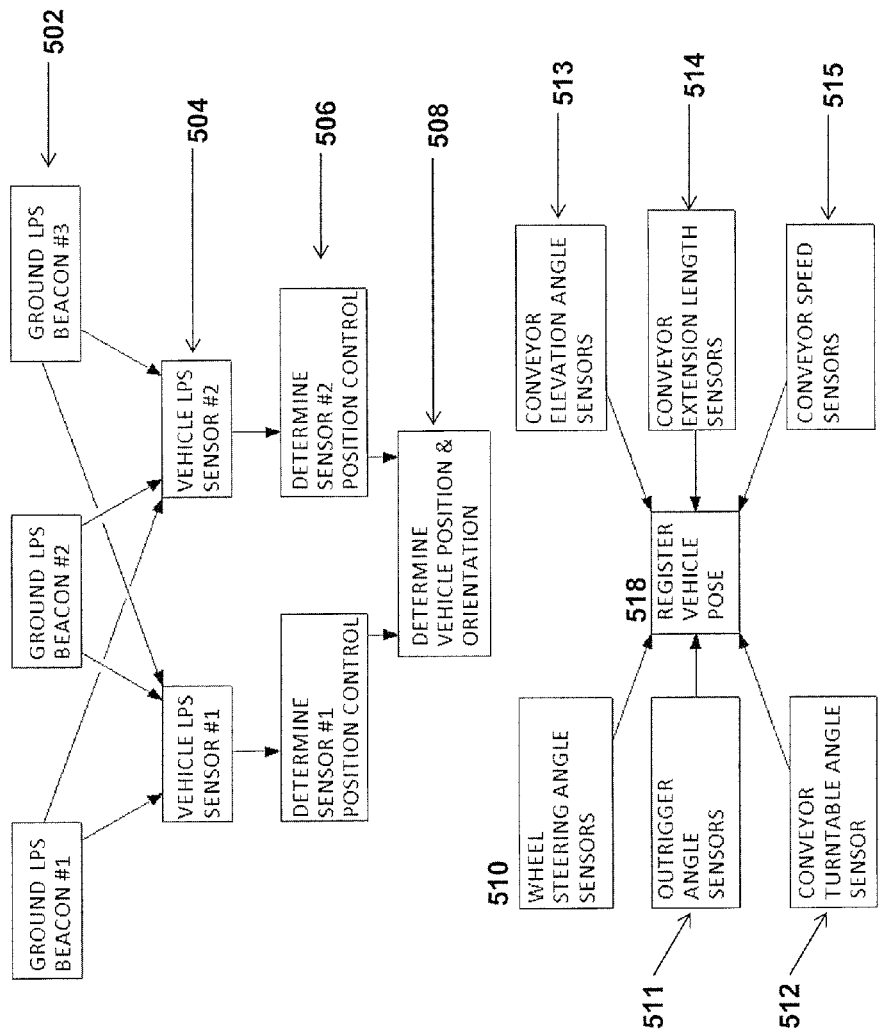
FIGS. 5A to 5E illustrate various control system processes provided in accordance with certain embodiments of the present invention.

FIG. 5A illustrates a process for determining vehicle position, orientation and pose from sensor readings. An LPS system is used for determining vehicle position and orientation as follows. Plural ground-based LPS beacons 502 are provided at predetermined fixed locations at the worksite and operatively coupled to plural LPS sensors 504 mounted at predetermined locations on the vehicle. Each of the LPS sensors 504 receives and processes signals from the plural LPS beacons 502 in order to determine 506 its position coordinates indicative of sensor location relative to the beacons, expressed in terms of a local coordinate system. These position coordinates are then timestamped and used to determine 508 position and orientation of the vehicle as described elsewhere herein. For vehicle pose, readings are obtained from various associated sensors, such as wheel steering angle sensors 510, outrigger angle sensors 511, conveyor turntable angle sensor 512, conveyor elevation angle sensors 513, conveyor extension length sensors 514, and conveyor speed sensors 515. When there are plural components such as wheels, outriggers, conveyors, and the like, there may be sensors associated with each of the plural components. The sensor readings are digitized, timestamped and registered 518 as the vehicle pose. In some embodiments, a current vehicle position, orientation and pose is provided. In some embodiments, a trajectory of vehicle position, orientation and pose through time is recorded and provided.

Figure 5B:
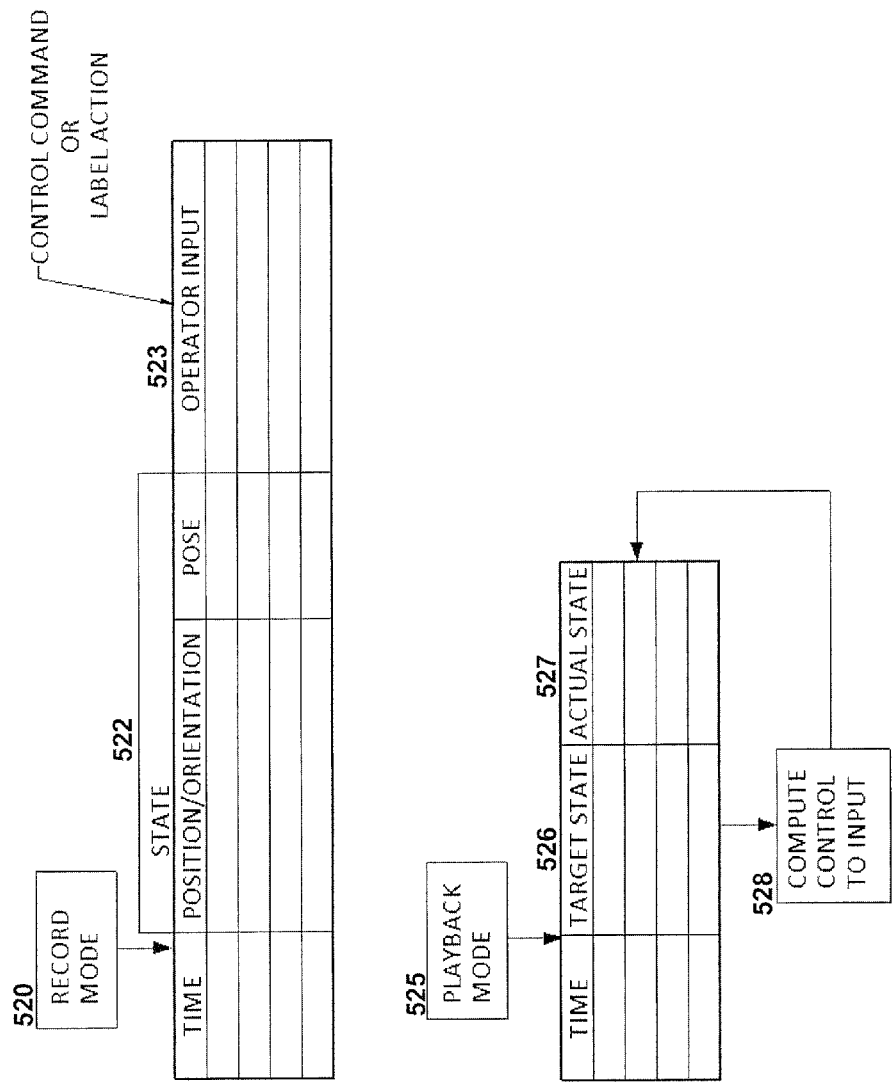

FIG. 5B illustrates a process for recording and playing back vehicle movements. In a record mode 520 a time-stamped sequence of vehicle states 522 is obtained and stored in computer memory. Vehicle states include position, orientation and pose. Optionally operator inputs 523 such as control commands, labelling actions input by the operator to be associated with a particular vehicle state to be remembered and later recalled, or the like, may also be provided. The record mode thus logs vehicle movements and/or associated operator inputs.

In a playback mode 525 a sequence of target states 526 is provided, along with times at which the target states are to be reached. Each state represents a vehicle position, orientation and/or pose. The target states and corresponding times may be configured to replicate a previously recorded trajectory of the vehicle position, orientation and/or pose. A sequence of actual states 527 is also obtained from vehicle sensors. The target states and actual states are used to compute 528 a control signal to automatically input to the vehicle components, in accordance with feedback control methodologies. For example, given an actual vehicle state at current time t(1), a control input may be computed which is intended to bring the vehicle to a known target state at future time t(2). Various control methodologies, such as Linear-quadratic Gaussian control or nonlinear control with or without noise may be used to calculate desired control inputs.

The record mode is initiated and later stopped by an operator to record a particular vehicle position, orientation and/or pose state or trajectory. Recorded states or trajectories may be labelled by the operator for later playback. The playback mode is initiated to cause the vehicle to return to a previously recorded state or to repeat a previously recorded trajectory. A playback dialog may prompt the user to select a previously recorded and stored state or trajectory for playback, for example indexed by label. In one embodiment, an animated preview of simulated vehicle operation, or other type of preview, such as a diagrammatic outline of associated vehicle motion, accompanies each playback candidate.

Figure 5C:
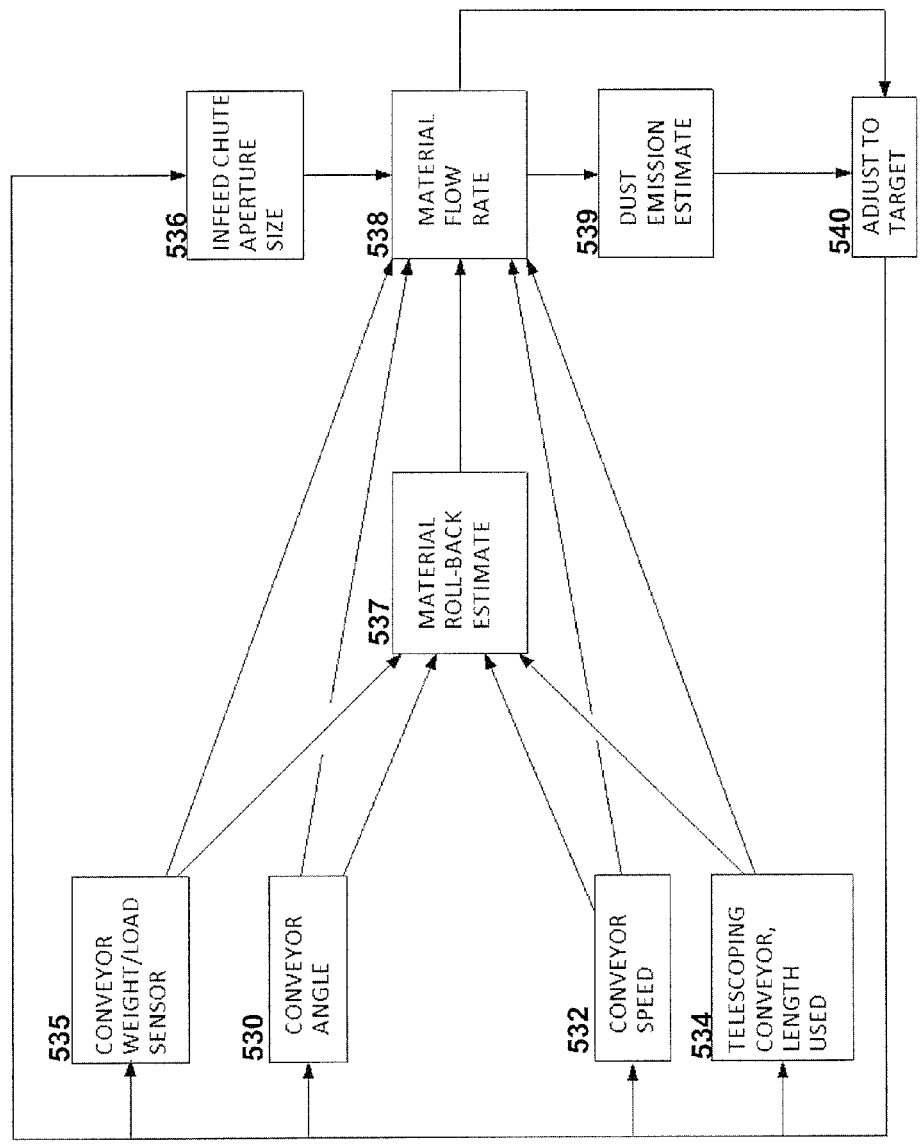

FIG. 5C illustrates a process for monitoring and controlling material flow rate on the vehicle conveyors. The volumetric rate at which material is carried by the conveyors is dependent on various factors, which are detected using sensors. The process comprises detecting conveyor angle 530, conveyor speed 532, and conveyor length 534, and measuring weight or load borne by one or both of the infeed and output conveyors 535. The above sensor readings are used, possibly along with other readings not shown, to generate an estimate 537 of the rate or amount of material roll back or bounce back on the conveyor, which causes bulk material to move slower than the conveyor's speed due to motion of the material relative to the conveyor and in the opposite direction of the conveyor motion. Material rollback occurs for example when bulk material is first fed onto a conveyor with a velocity (speed and direction) that differs from the conveyor velocity, or potentially due to gravity on an angled conveyor. Longer conveyors may experience more overall material roll-back since more material is present. Greater depths of material on a conveyor may result in increased rollback. Steeper conveyors may experience more material roll-back per unit length. Different types of materials or mixtures thereof may roll-back and/or bounce to different degrees. The material roll back estimate 537 along with the above sensor readings and also optionally a sensor reading 536 indicative of infeed chute aperture size may be used to determine an overall material flow rate, which is a volumetric rate at which material is moved by the conveyors. This may be a function of speed of the bulk material on the conveyors, volume of material entering the conveyors, distance travelled, and the like. Direct monitoring of the rate at which material is provided to the conveyor along with monitoring of the weight of material on the conveyor may be used to determine an overall material flow rate 538 on the conveyor. In some embodiments, an estimate of the amount of dust emission 539 may be obtained directly (from dust sensors such as optical sensors) and/or from other readings. For example, given material susceptibility to dust and agitation, for example as based on material type and/or moisture content, along with the amount of material being moved, an estimate of the amount of dust may be determined from a predetermined model. If the dust exceeds a predetermined threshold, an alarm or flow rate reduction may be triggered. Finally, if the material flow rate does not match a target material flow rate, various adjustments 540 to vehicle pose may be made, and the process repeated.

In some embodiments, the control system may be configured to estimate material roll-back and/or bounce-back, and to adjust operation of the material handling vehicle to limit the amount of roll-back and/or bounce-back if necessary. Operational adjustments may include adjusting conveyor speed, relative conveyor speeds, or conveyor angle.

Figure 5D:
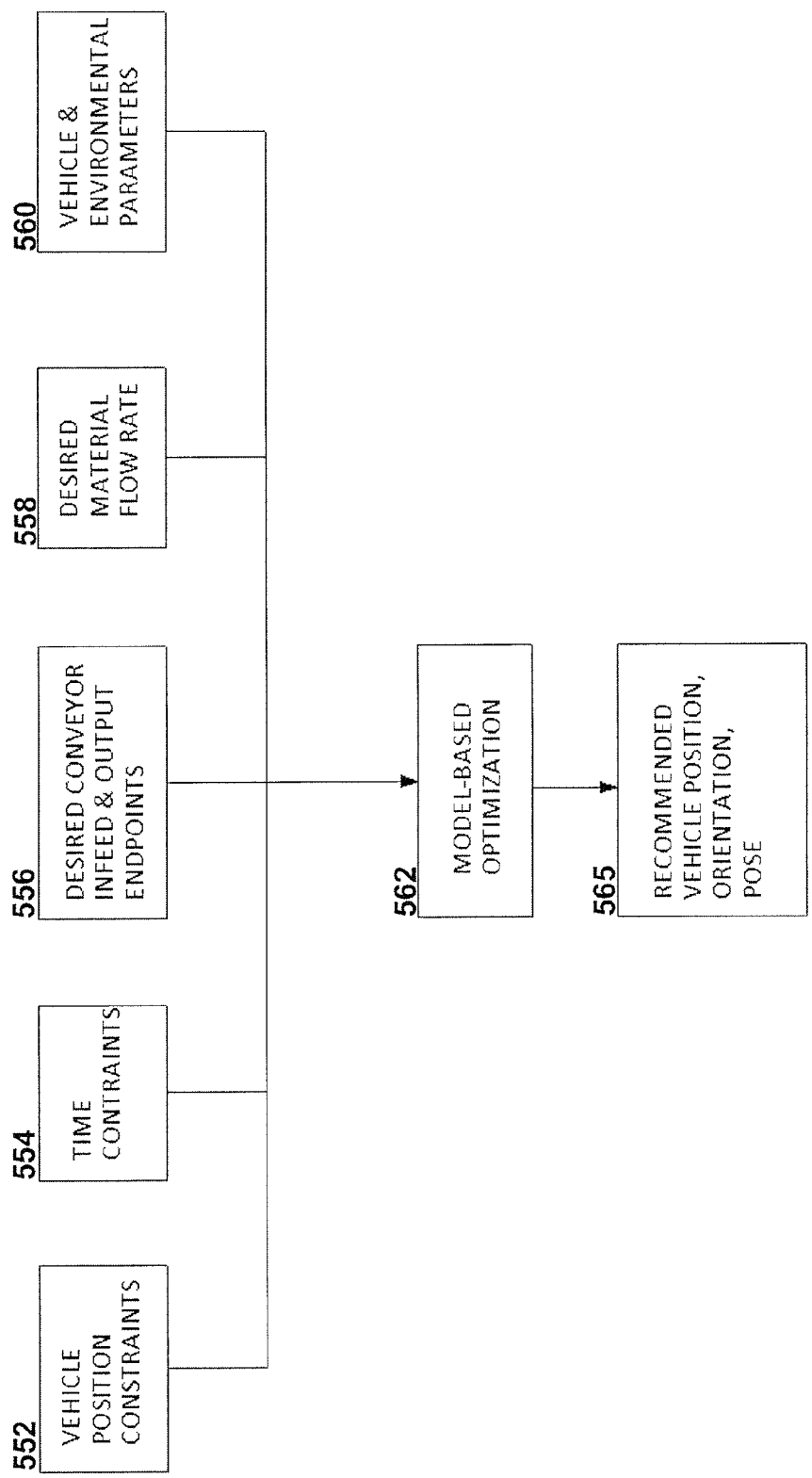

FIG. 5D illustrates a process for determining a desired vehicle position, orientation and pose. Vehicle position constraints 552, which may include vehicle orientation and vehicle pose constraints, are obtained, for example from operator input indicative of obstacles or designated vehicle position areas. Time constraints 554 are obtained, for example indicative of operational start and stop times, or mid-term to long-term rates at which material is to be provided by the vehicle, or scheduled arrival and departure times of material source trailers, or limits on times taken to reposition, reorient or repose the vehicle, or the like. Conveyor infeed and output endpoints 556 may also be obtained, for example indicative of three-dimensional location of material source gates and material destination hatches, either from operator input or sensor readings. A desired material flow rate 558 may also be obtained, for example which ensures that sufficient material is provided to storage containers for continuous downstream usage, for example for hydraulic fracking purposes. Relevant vehicle parameters and environmental parameters 560 may also be obtained, for example indicative of worksite layout, obstacles, weather conditions, vehicle limitations on speed, limitations on ranges of various mechanical components, and the like. These factors may be provided as input to a model-based optimization module 562 which comprises a computer or microprocessor and is configured to determine a recommended state comprising vehicle position, orientation and pose 565 from the provided inputs. For example, a vehicle state may be computed which places the conveyor infeed input and output endpoints at the desired locations, subject to position constraints and relevant limitations imposed by vehicle and environmental parameters, and which satisfies the desired material flow rate and time constraints, for example with respect to vehicle repositioning time. Recommended vehicle states may be implemented automatically or with operator consent. The recommended vehicle state may correspond to a final state or a discrete or continuous trajectory of states.

Figure 5E:
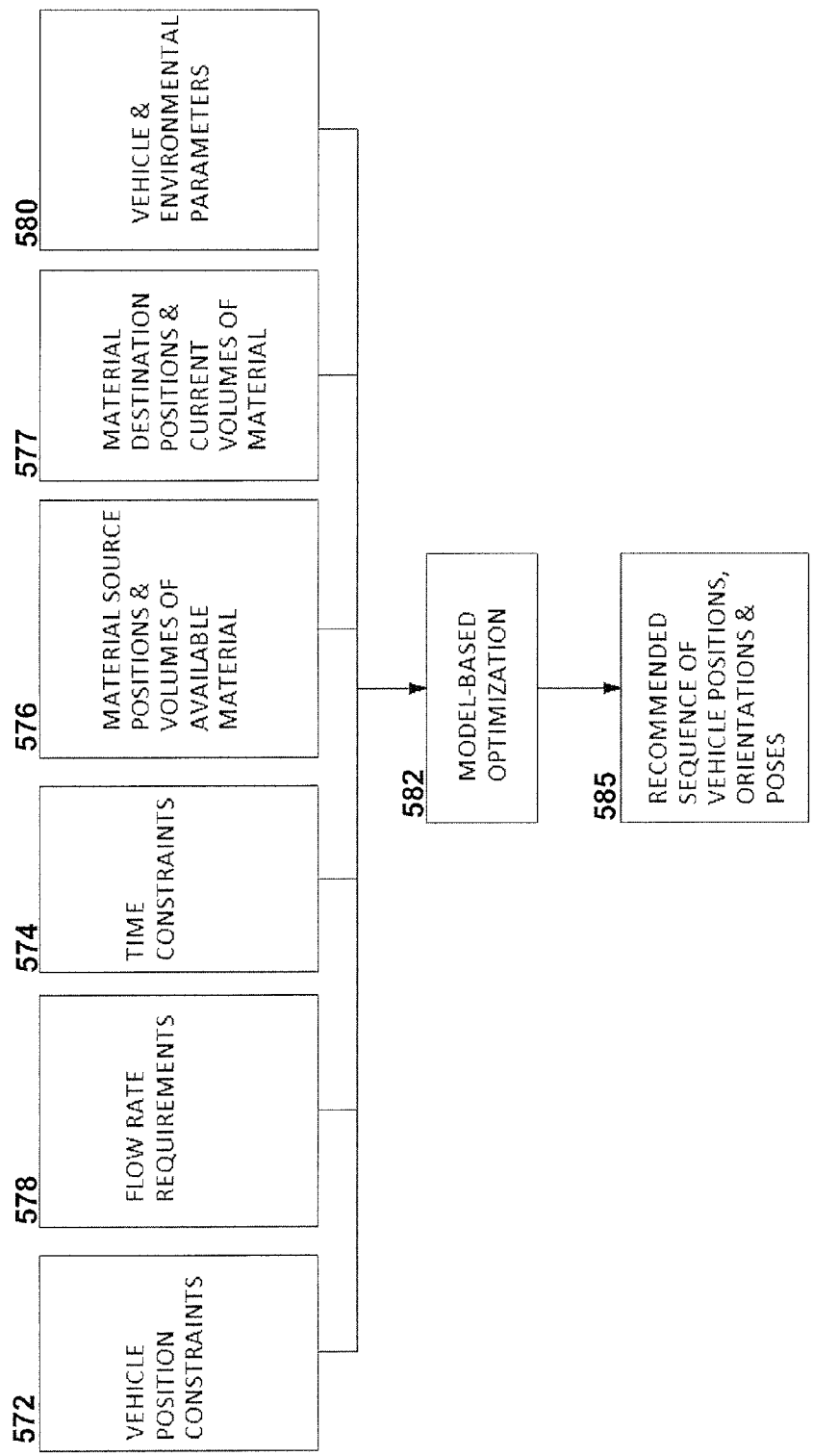

FIG. 5E illustrates a process for determining a desired sequence of vehicle positions, orientations and poses. This is in contrast to determining a single vehicle position and pose as illustrated in FIG. 5D. Vehicle position constraints 572 are obtained, for example from operator input indicative of obstacles or designated vehicle position areas. Time constraints 574 are obtained, for example indicative of operational start and stop times, or mid-term to long-term rates at which material is to be provided by the vehicle, or scheduled arrival and departure times of material source trailers, or limits on times taken to reposition, reorient or repose the vehicle, or the like. At least one material source gate position and corresponding volume of material stored in a container associated with said gate may be obtained 576, and at least one material destination hatch position and corresponding volume of material currently stored in a container associated with said hatch may be obtained 577. If plural source gates or destination hatches are associated with a common container this may also be indicated. Material flow rate requirements 578 may also be obtained, for example which ensures that sufficient material is provided to storage containers for continuous downstream usage, for example for hydraulic fracking purposes. Relevant vehicle parameters and environmental parameters 580 may also be obtained, for example indicative of worksite layout, obstacles, weather conditions, vehicle limitations on speed, limitations on ranges of various mechanical components, and the like. These factors may be provided as input to a model-based optimization module 582 which comprises a computer or microprocessor and is configured to determine a recommended sequence of states comprising vehicle positions, orientations and poses 585 from the provided inputs. For example, a given vehicle state may be computed which places the conveyor infeed input and output endpoints at desired locations adjacent to a desired material source gate and destination hatch, respectively, subject to position constraints and relevant limitations imposed by vehicle and environmental parameters, and which satisfies the desired material flow rate and time constraints, for example with respect to vehicle repositioning time. The sequence of vehicle states may correspond to different vehicle states provided for different specified time intervals, for example in order to convey different volumes of material between different combinations of material sources and destinations. Recommended vehicle states may be implemented automatically or with operator consent.

Steering Knuckle Positional Control

Various embodiments of the present invention relate to drive wheel steering control, for example to facilitate two-wheel or four-wheel steering of the vehicle. As described above, the drive wheels may be steered via use of steering knuckles.

Figure 7:
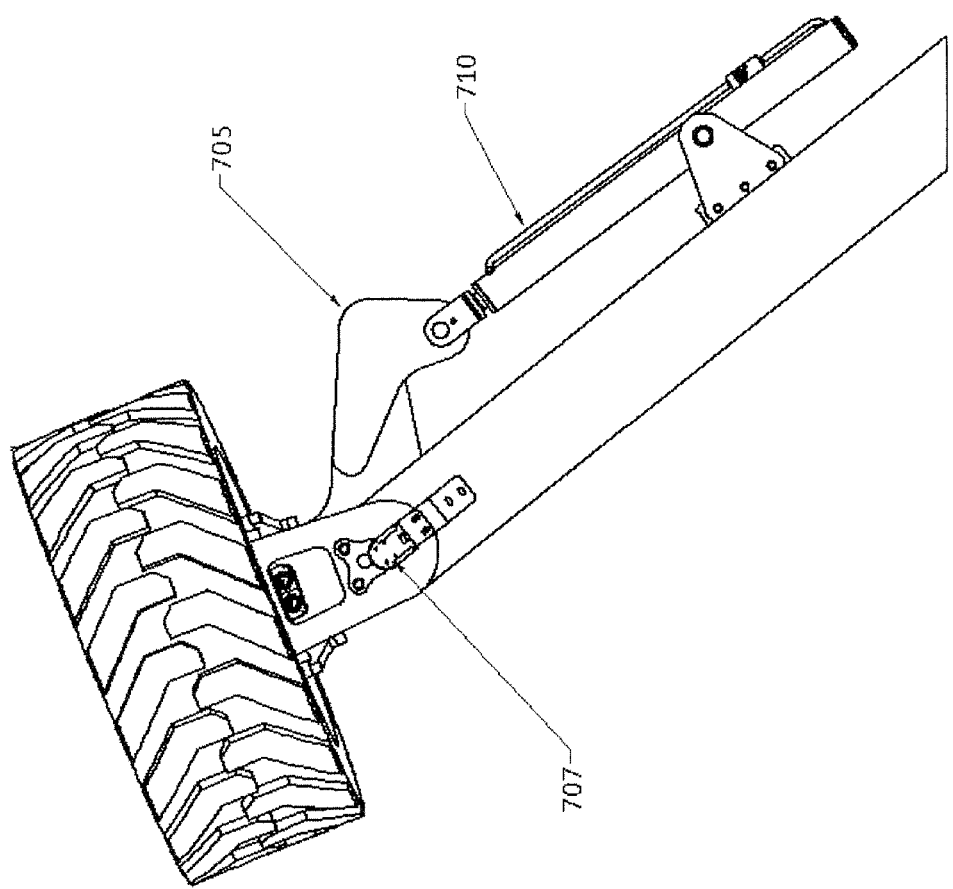
FIG. 7 illustrates steering knuckle positional control, in accordance with one embodiment of the invention.

In some embodiments, steering proceeds as follows, with reference to FIG. 7. First, rotary positional sensors 707 mounted to each of steering knuckles 705 transmit signals with current locations to a control centre. Signals indicative of a desired new steering knuckle position may be transmitted to the control centre from remote control, or from manually operated stack valves, or computed by the control centre automatically. The control centre then compares these desired positions to current positions for each steering knuckle. The control centre then signals the appropriate hydraulic stack valve to provide hydraulic flow to cylinders 710 and/or drive motors in order to pivot the steering knuckles. The rate of cylinder push/pull may be controlled in proportion to the rate of wheel rotation, for example in order to reduce wheel scrub in which the wheel skids rather than rolls along the ground. Actuation of the wheel knuckles continues until the desired angles of the steering knuckles are reached. The rate of movement may decrease as the difference between the measured wheel angle and the desired wheel angle decreases, to allow for smoother movement.

Outrigger Positional Control

As also described above, various embodiments of the present invention relate to a vehicle which includes "outriggers" or support arms which are pivotably mounted to the vehicle chassis and to which the wheels are mounted.

Figure 8:
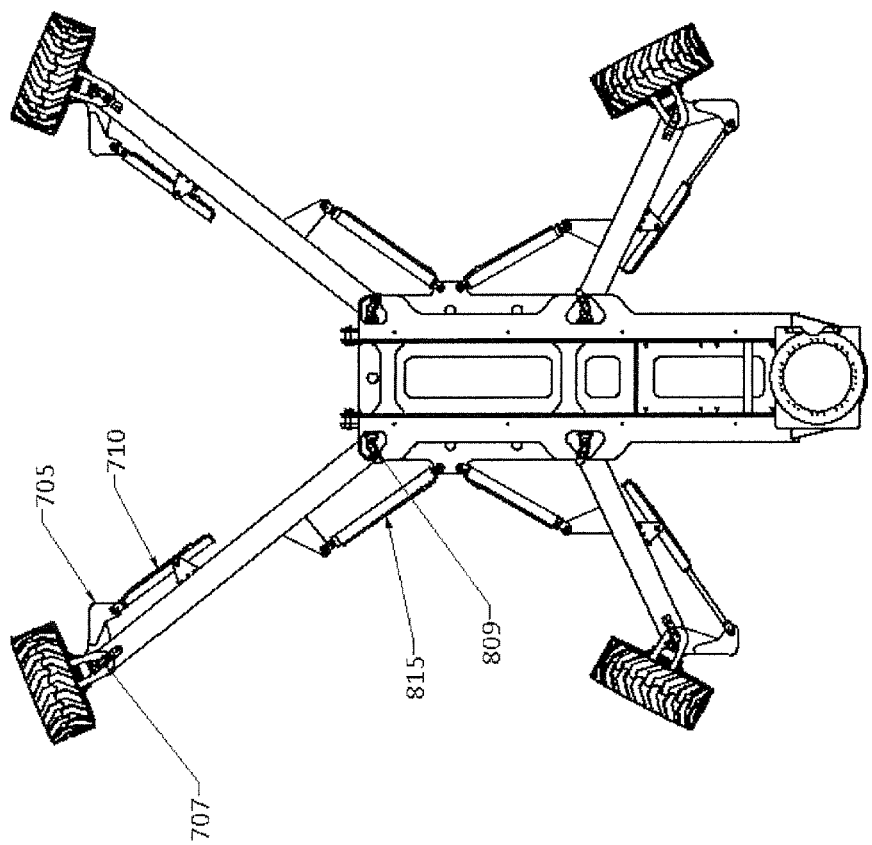
FIG. 8 illustrates outrigger positional control, in accordance with one embodiment of the invention.

In some embodiments, outrigger position control proceeds as follows, with reference to FIG. 8. Rotary position sensors mounted to each of four outriggers and four steering knuckles, such as knuckle 705 transmit signals indicative of current angular position to the control centre. Sensors 707 and 809 are illustrated as examples. Signals indicative of a desired new set of outrigger positions may be transmitted to the control centre from remote control or computed by the control centre automatically. The control centre then compares these desired positions to current positions for each outrigger. The control centre then signals the appropriate hydraulic stack valve to provide hydraulic flow to cylinders, such as cylinder 815 and/or drive motors in order to pivot the outriggers. The rate of cylinder push/pull may again be controlled in proportion to the rate of wheel rotation, for example in order to reduce wheel scrub. Actuation of the outriggers continues until the desired angles of the outriggers, measured relative to the chassis, are reached. The rate of movement may decrease as the difference between the measured outrigger angle and the desired outrigger angle decreases, to allow for smoother movement.

Wheel steering knuckle control may be performed concurrently in order to allow the wheels to roll rather than skid during repositioning of the outriggers. For example, when the outrigger is stationary, the wheels may be oriented so that their rolling direction is perpendicular to outrigger's length, or more particularly perpendicular to a line connecting the pivot point between the outrigger and chassis with the centre point of the wheel. Cylinder 710 is illustrated as an example steering knuckle actuating cylinder. Furthermore, the wheels may be driven at a speed commensurate with the angular velocity of the outriggers in order to assist in outrigger repositioning. This may allow a lower powered actuation mechanism connected between the outrigger and chassis to be used.

In some embodiments, outrigger position may be controlled in order to adjust various characteristics of the vehicle, such as compactness for stowability, vehicle stability, ease of transportation in a particular direction, or the like.

For example, in one embodiment, in preparation for material handling by the vehicle conveyors, the outriggers may be adjusted so that the (nominally) four wheels define vertices of a quadrilateral with relatively maximal area. Such a configuration is illustrated approximately in FIG. 8, for example. This corresponds to a substantially large separation of the wheels in both planar directions which may improve vehicle stability against tipping. Additionally, such a configuration allows for improved granularity of control for rotation in place of the vehicle due to increased separation of the wheels from each other and/or from the vehicle's pivot point which may be near the vehicle's geometric centre. For example, given a circle centred on the pivot point and along which one or more of the wheels travels for vehicle rotation, as the diameter of this circle increases, one turn of the wheel corresponds to a smaller angular rotation of the vehicle, and hence for a limited granularity of control over wheel rotation, more accurate angular position can be achieved for a larger diameter circle. Furthermore, steering of the wheel can be more accurately achieved when following a larger circle than when following a smaller circle, due to the difficulty of tracking a more quickly varying curvature of the smaller circle.

It is noted that, in various embodiments, when the wheels are used to rotate the vehicle in place and thus pivot the output conveyor, the support arms rotate along with the output conveyor and the vehicle remains at roughly the same level of stability regardless of where the output conveyor is positioned. That is, the position of the base, i.e. the ground-contacting points, of the vehicle is substantially unchanged relative to the position of the output conveyor during rotation of the output conveyor. Hence, if the vehicle's centre of gravity is dictated in large part by the vehicle body and output conveyor (relative to that portion dictated by the position of the infeed conveyor), then said centre of gravity essentially does not move relative to the vehicle's wheels during rotation of the output conveyor.

Additionally, in preparation for material handling by the vehicle conveyors, the wheels may be angled so that their rolling direction is perpendicular to their corresponding outrigger's length, or otherwise oriented so that their rolling direction is substantially different from the direction of horizontal forces imparted to the vehicle due to material conveyance. This may allow the wheels to more effectively brace the vehicle against shock forces that would travel down the outrigger lengths, since the wheels would not tend to be rotated by such forces as their direction of rotation is orthogonal to the outrigger lengths. In addition, wheels oriented in this way are readied for facilitating vehicle rotation in place. On the other hand, if it is desired to brace against forces that tend to undesirably rotate the vehicle in place, then some or all of the wheels may be oriented in a different direction.

Alternatively, rather than orienting the wheels so that their rolling direction is across the direction of shock forces, it may be desirable in some embodiments to brace the wheels against such forces by orienting them parallel to the direction of those forces, and using wheel brakes or back force of the electric or hydraulic wheel drive motor to provide the bracing. While this method may require a more active application of counter forces, the wheel structure may be more robust to the application of force when handling forces along its rolling direction rather than perpendicular to its rolling direction.

Steering Control

In various embodiments, vehicle steering is provided, for example by invoking the steering knuckle positional control described above. Such steering may be used in guiding the vehicle during travel from place to place, for example automatically.

Figure 9:
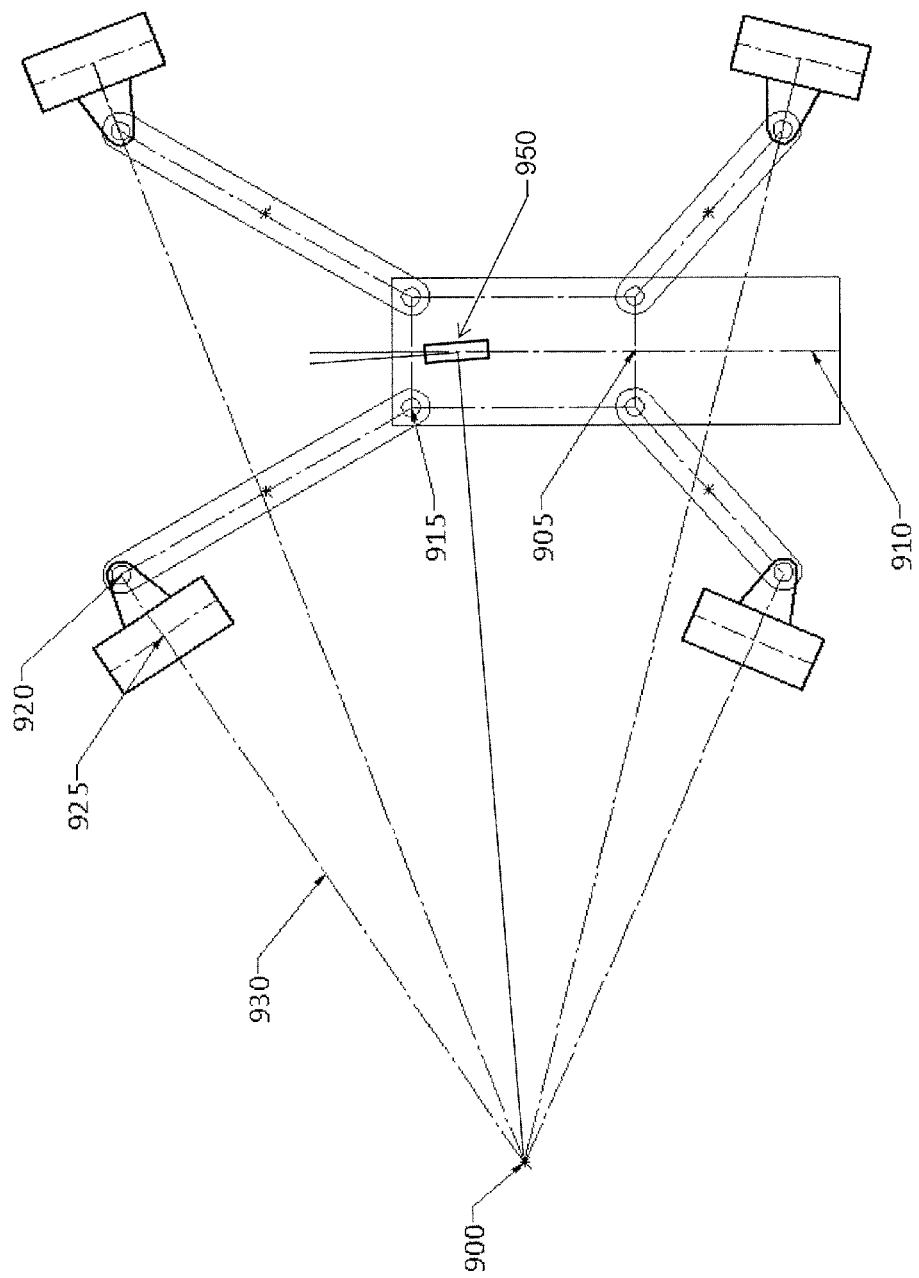
FIG. 9 illustrates steering control, in accordance with one embodiment of the invention.

In some embodiments, steering control proceeds as follows, with reference to FIG. 9. First, a pre-defined steering axis 900 is established with relation to the vehicle's nominal origin 905. A command to steer causes this axis to move progressively closer to the vehicle's midline 910. For each wheel, the control centre receives as input: a vector from the steering axis 900 to the origin 905; a vector from the origin 905 to each outrigger pivot point/pin, such as pin 915; a vector from each outrigger pivot point/pin, such as pin 915 to the corresponding steering knuckle pivot/pin, such as pin 920, this vector being determined in view of the outrigger length and input from the outrigger's pivot/angular sensor; and a vector from each steering knuckle pivot/pin, such as pin 920 to the centre/hub of the corresponding wheel, such as hub 925, this vector being determined using pre-determined length and input from the steering knuckle angular sensor. From the above information, a vector from the wheel centre to the steering axis 900, such as vector 930, is determined, for example via vector addition. Next, hydraulic power is delivered to each wheel drive motor to tend to make parallel the angle between the vector from the wheel to pin 920 and the wheel to the steering axis. In various embodiments, steering control is configured to limit the angle between the wheel and the outrigger to prevent the wheel from rubbing.

In some embodiments, steering control is configured utilizing the concept of a "virtual wheel" as follows. A hypothetical virtual wheel 950 is simulated within the control system, the virtual wheel 950 located along the vehicle's midline 910 and oriented tangentially with respect to a circle centred on the steering axis 900. As the virtual wheel 950 turns, the axis of rotation is calculated. So, instead of the radius being the driving factor, the angle of the virtual wheel drives the axis of rotation. This particular configuration of steering control provides for an adaptive sensitivity of steering which may represent an improvement over the case where the predefined steering axis 900 moves towards the vehicle's midline in a linear manner, for example. Thus, for example, the steering control utilizing the virtual wheel concept avoids or mitigates a loss of steering sensitivity when the vehicle is turning with a large radius and also avoids or mitigates a steering oversensitivity when the vehicle is turning with a tight radius.

In various embodiments, four-wheel steering solutions such as double Ackermann steering may be employed. Steering may be facilitated by pivoting of the wheels, pivoting of the outriggers, or a combination thereof.

In various embodiments, steering control or other control related to wheel angle, comprises adjusting wheel angles in view of the current angle of the support arms holding the wheels, which may be variable. In some further embodiments, steering control or other control related to wheel angle comprises coordinated adjustment of both wheel angle and support arm angle.

Slewing Control

In various embodiments, vehicle slewing or rotation-in-place control is provided, for example by invoking the steering knuckle positional control and outrigger positional control described above. Such control may be used in guiding the vehicle during rotation in place, for example automatically in order to reposition one or both of the vehicle conveyors.

Figure 10:
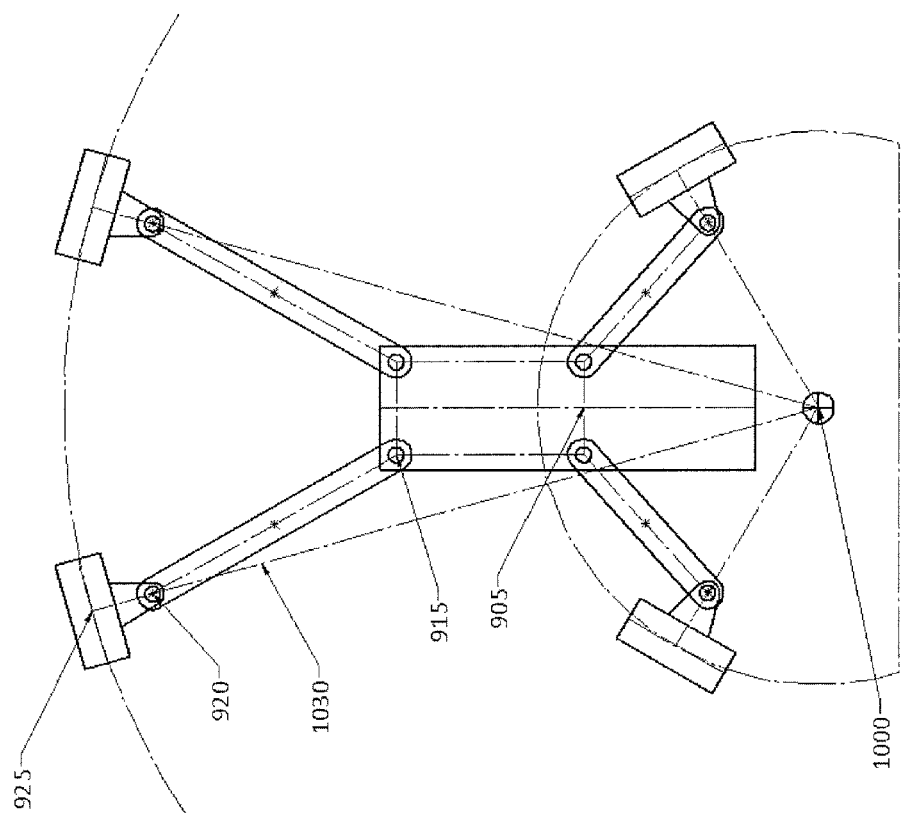
FIG. 10 illustrates slewing control, in accordance with one embodiment of the invention.

In some embodiments, slewing control proceeds as follows, with reference to FIG. 10. First, a desired axis of rotation 1000 is established with relation to the vehicle's origin 905. For each wheel, the control centre receives as input: a vector from the axis of rotation 1000 to the origin 905; a vector from the origin 905 to each outrigger pivot point/pin, such as pin 915; a vector from each outrigger pivot point/pin, such as pin 915 to the corresponding steering knuckle pivot/pin, such as pin 920, this vector being determined in view of the outrigger length and input from the outrigger's pivot/angular sensor; and a vector from each steering knuckle pivot/pin, such as pin 920 to the centre/hub of the corresponding wheel, such as hub 925, this vector being determined using pre-determined length and input from the steering knuckle angular sensor. From the above information, a vector from the wheel centre to the axis of rotation is determined, for example via vector addition, such as vector 1030. Next, hydraulic power is delivered to each wheel drive motor and/or outrigger positioning system to tend to decrease to zero the angle between the vector from the wheel to the knuckle and the wheel to the axis of rotation. The above facilitates alignment to the axis of rotation.

Subsequently, the wheels are driven to facilitate rotation in place. In some embodiments, this comprises the following. First, the remote control transmits a rotation rate and direction of rotation to the control centre. Subsequently, the control centre uses this input to calculate direction of rotation and rate of rotation for each wheel. Then, the control centre monitors difference between required and actual rate of rotation and adjusts flow accordingly. In some embodiments, this function is provided by the control valves themselves.

It is noted that the wheels and/or outriggers may be oriented so that the axis of vehicle rotation can be varied to a desired location within an envelope. For example, the (generally vertical) axis of rotation may be aligned with the centre of the turntable upon which one of the vehicle conveyors is mounted. The axis of rotation may alternatively be placed at a different location passing through a different part of the vehicle, in which case the vehicle rotates in place about this point. The axis of rotation may alternatively be placed at a different location away from the vehicle, in which case the vehicle traverses about the axis in a generally circular manner. More particularly, each portion of the vehicle may traverse the axis in a circular manner. For example, if the vehicle initially faces away from the axis, it will continue to face away from the axis during traversal.

Multi-Directional Translation Control

In various embodiments, vehicle translation control is provided, in which the vehicle may transport from place to place, possibly without substantially changing its rotational orientation. This type of translation control may be likened to "crab walking" in that the vehicle may translate in a given direction without requiring its nominal front end to face in said direction.

Figure 11:
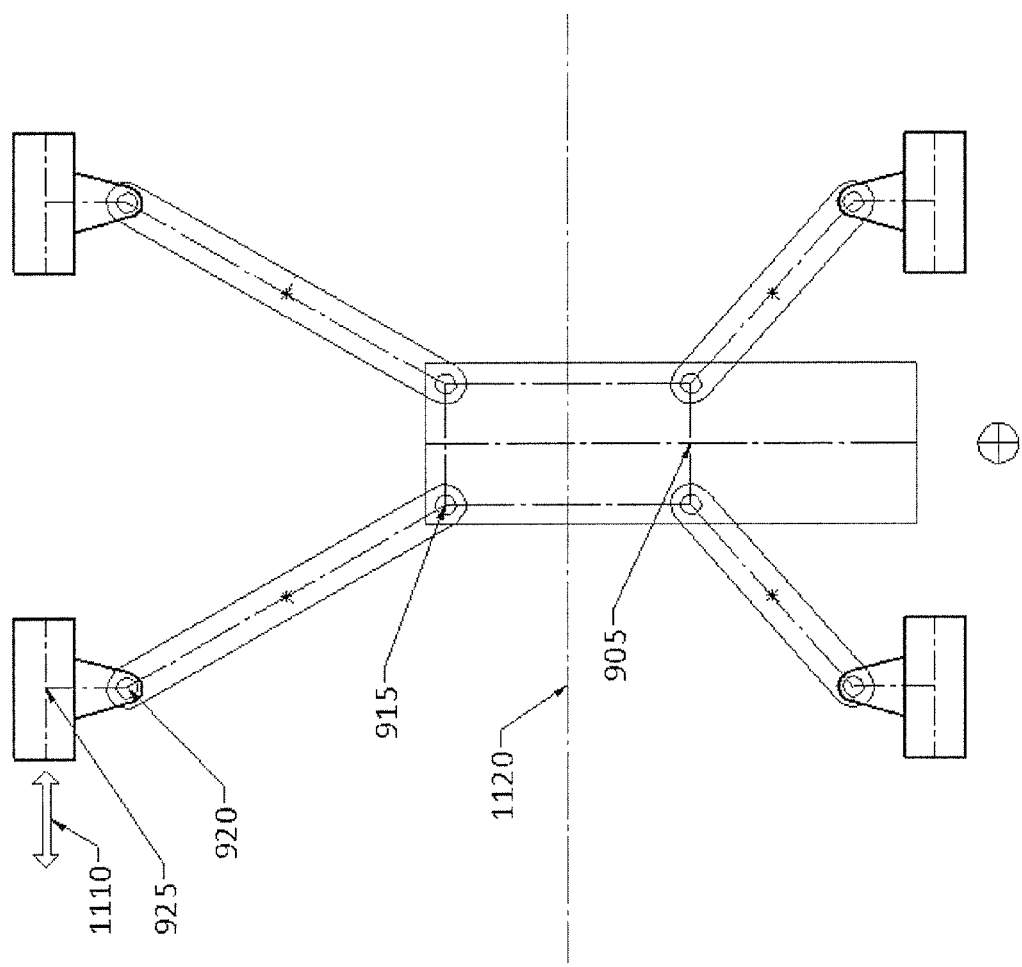
FIG. 11 illustrates multi-directional translation control, in accordance with one embodiment of the invention.

In some embodiments, this form of translation control utilizes steering knuckle positional control and outrigger positional control and proceeds as follows, with reference to FIG. 11. For each wheel, the control centre receives as input: a vector from the origin 905 to each outrigger pivot point/pin, such as pin 915; a vector from each outrigger pivot point/pin to the corresponding steering knuckle pivot/pin, such as from pin 915 to pin 920, this vector being determined in view of the outrigger length and input from the outrigger's pivot/angular sensor; and a vector from each steering knuckle pivot/pin to the centre/hub of the corresponding wheel, such as from pin 920 to hub 925, this vector being determined using pre-determined length and input from the steering knuckle angular sensor. From the above information, the control centre determines the centre plane of each wheel, that is, the potential rolling directions of travel, such as directions 1110. Next, hydraulic power is delivered to the various steering and outrigger hydraulics to decrease the angle between the planes of the wheels and the desired direction of travel 1120.

Subsequently, the wheels are driven to facilitate the vehicle translation. In some embodiments, this comprises the following. First, the remote control transmits a rate and direction of wheel rotation to the control centre. Subsequently, the control centre uses this input to calculate direction of rotation and rate of rotation for each wheel. Then, the control centre monitors difference between required and actual rate of rotation and adjusts flow accordingly. In some embodiments, this function is provided by the control valves themselves.

Material Source Auto-Location Control

In various embodiments, the vehicle is configured to automatically identify and locate a source of bulk material and move itself into position to receive material from this source. In some embodiments, multiple sources of material may be identified and located and one source may be selected at a time, optionally automatically.

In some embodiments, source auto-location is performed under operator guidance, for example as follows. The operator positions the receiving hopper under the first outlet gate of a given material source, such as a semi-trailer carrying bulk material, and then enters the source's designation number, such as a nominal trailer number, into the system's interface. The control centre then records the position of each associated vehicle component for the gate position, as well as the vehicle's location coordinates within a defined ground coordinate system. The operator continues to position the hopper under each gate of the source and records each position in the system's interface. From the positional data, the control system determines the relative positions of each gate. When the trailer is re-positioned in front of the vehicle, the operator re-positions the hopper. The control system then determines the movements required to move the hopper to the other known gate locations. The control centre may be configured to reposition the vehicle assuming that the material source always moves along the same path. Furthermore, as the vehicle slews, the control system may determine the angle through which the vehicle has moved and account for this movement in locating the source gates.

In some embodiments, rather than learning from operator input, the control system is configured to use sensors located on the infeed conveyor to detect a source signal located on the bulk material source. The control centre may then control flow to the system's hydraulics in order to decrease the distance from the sensors to the source signal, or otherwise position the infeed conveyor relative to the source signal.

Material Destination Auto-Location Control

In various embodiments, the vehicle is configured to automatically identify and locate a destination for bulk material, such as a material input hatch of a storage silo, and move itself into position to supply material to this destination. In some embodiments, multiple destinations for material may be identified and located and one destination may be selected at a time, optionally automatically.

In some embodiments, destination auto-location is performed under operator guidance, for example as follows. The operator positions the vehicle's material discharge chute above the first hatch of a given material destination, and then enters the destination's nominal designation number into the system's interface. The control centre then records the position of each associated vehicle component for the gate position, as well as the vehicle's location coordinates within a defined ground coordinate system. The operator continues to position the output conveyor's discharge chute above each additional hatch of the material destination or group of destinations and records each position in the system's interface. Vehicle movements used in repositioning the discharge chute from one hatch to the next may also be recorded. From the positional data and movement data, the control system determines the relative positions of each hatch. When the operator directs the control centre to reposition the vehicle to a known location, the control centre determines which movements are required to complete this movement. The controls system may be configured to select movements based on one or more factors such as: fewest number of movements; shortest path; quickest path; and minimal lift boom angle.

In some embodiments, rather than learning from operator input, the control system is configured to use sensors located on the output conveyor to detect a source signal located on the bulk material destination hatch. The control centre may then control flow to the system's hydraulics in order to decrease the distance from the sensors to the source signal, or otherwise position the output conveyor relative to the source signal. A combination of one or more of: recording operator commands, deadreckoning position, orientation and pose using vehicle sensors, and detection of hatch beacon signals and/or LPS beacon signals may be used for hatch auto-location control.

Counter-Slewing Control

This function allows the vehicle to slew its infeed conveyor in an opposite manner to the slewing of the vehicle. The infeed conveyor then remains stationary relative to the ground. Thus, the vehicle can rotate in order to reposition the output conveyor non-rotatably fixed thereto, while maintaining the infeed conveyor in place.

In some embodiments, this function proceeds as follows. The vehicle is configured to rotate in place about an axis that coincides with the centre of the turntable supporting the infeed conveyor, as described above. During vehicle rotation, the wheels' rate of rotation and position of the wheels relative to the machine's centre of rotation is anticipated from the control routine and optionally also monitored for variation. The control centre determines from this information the angular velocity of the vehicle during rotation-in-place. Concurrently, turntable supporting the infeed conveyor is controlled so as to rotate at the same angular speed but in the opposite direction, thereby maintaining the infeed conveyor in place.

In some embodiments and for some movements, it is possible to maintain the input end of the infeed conveyor in place even if the axis of rotation does not pass directly through the turntable centre. This may be performed by suitable counter-rotation of the turntable simultaneously with extension and/or retraction of the infeed conveyor telescoping mechanism. The required instantaneous velocity of counter-rotation and variation of the conveyor length may be calculated from a suitable model of the vehicle rotation.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A control system for a mobile conveyor vehicle for transporting material, the mobile conveyor vehicle including:
   a first belt conveyor system and a second belt conveyor system mounted on a chassis and cooperatively coupled for conveyance of the material from an infeed end of the first belt conveyor system to an output end of the second belt conveyor system;
   a first powered actuator system coupled to the first belt conveyor system for driving the infeed end to a desired location relative to the mobile conveyor vehicle;
   a second powered actuator system coupled to the second belt conveyor system for driving the output end to a desired location relative to the mobile conveyor vehicle; and
   a steerable, powered drive system for supporting and transporting the mobile conveyor vehicle on a surface, wherein the control system comprises:
   a. an operator interface configured to receive user input indicative of a desired infeed location of the infeed end and a desired output location of the output end;
   b. a computation module configured to determine a control solution for disposing the infeed end at the desired infeed location and disposing the output end at the desired output location; and
   c. a control center configured to cooperatively operate the first powered actuator system, the second powered actuator system and the powered drive system according to the control solution,
   wherein the steerable, powered drive system is operative in a first operating condition to rotate the chassis about a pivot point, the pivot point being selectable relative to the chassis, thereby rotationally positioning at least one of the first belt conveyor system and the second belt conveyor system, and wherein the determined control solution disposes the steerable, powered drive system to rotate the mobile conveyor vehicle around a selected pivot point.

2. The control system according to claim 1, wherein one of the first belt conveyor system and the second belt conveyor system is non-rotatable horizontally with respect to the chassis.

3. The control system according to claim 2, wherein the steerable, powered drive system comprises at least three controllably horizontally pivotable support arms attached to the chassis and a plurality of controllably horizontally pivotable and drivable wheels mounted at respective ends of the support arms, and wherein steering of the steerable, powered drive system comprises horizontal pivoting of one or both of the at least three support arms and horizontal pivoting of the plurality of wheels.

4. The control system according to claim 3, further configured to adjust the support arms to maximize separation of the wheels mounted thereto in correspondence with the first operating condition of the mobile conveyor vehicle, thereby facilitating one or both of: increased stability of the mobile conveyor vehicle and increased angular control with respect to said rotation of the mobile conveyor vehicle in place about the selectable pivot point.

5. The control system according to claim 1, further configured to receive signals from one or more sensors associated with the mobile conveyor vehicle, said one or more sensors configured to detect a location of an identified material source, and wherein the desired infeed location is determined to correspond to the detected location of the identified material source.

6. The control system according to claim 1, further configured to receive signals from one or more sensors associated with the mobile conveyor vehicle, said one or more sensors configured to detect a location of an identified material destination, and wherein the desired output location is determined to correspond to the detected location of the identified material destination.

7. The control system according to claim 1, wherein determining the control solution comprises automatically determining two or more potential control solutions and selecting the control solution based on an optimization of at least one of the potential control solutions with respect to one or more further criteria.

8. The control system according to claim 1, wherein determining the control solution is based on one or more further criteria selected from the group comprising: a total distance travelled by the material; a level of dust production due to material handling; a determined elevation angle of the first belt conveyor system or a determined elevation angle of the second belt conveyor system or both; a number of direction changes of the material during transport; a total amount of direction change of the material during transport; and a loading level on one or more components including the first belt conveyor, the second belt conveyor, chassis and the steerable, powered drive system.

9. The control system according to claim 1, wherein the control solution comprises a sequence of mobile conveyor vehicle poses for disposing the infeed end and the output end at a sequence of different configurations, each different configuration held for a particular amount of time according to the control solution, thereby facilitating conveyance of controllable amounts of material between a plurality of combinations of sources and destinations.

10. The control system according to claim 1, further configured to determine, from sensor readings input thereto, a material flow rate indicative of a volumetric rate at which material is moved by the first belt conveyor system and the second belt conveyor system, said material flow rate accounting for an estimated amount of roll-back or bounce-back of material on the first belt conveyor system and the second belt conveyor system.

11. The control system according to claim 1, further configured to determine mobile conveyor vehicle orientation with respect to a local coordinate system by determining position within the local coordinate system of at least two predetermined points on the mobile conveyor vehicle and defining said mobile conveyor vehicle orientation based on relative angular position of said at least two predetermined points.

12. The control system according to claim 1, further comprising a record and playback module configured to record mobile conveyor vehicle movements performed under control of an operator, and to subsequently reproduce said recorded mobile conveyor vehicle movements automatically upon command.

13. The control system according to claim 1, further configured to adjust conveyor slope angle while retaining the infeed end at the desired infeed location and retaining the output end at the desired output location by making an adjustment in length of one or both of the infeed end of the first belt conveyor system and the output end of the second belt conveyor system, and moving the mobile conveyor vehicle chassis in compensation to the adjustment in length.

14. The control system according to claim 1, the control system further configured to maintain mobile conveyor vehicle pose within a range in which the first belt conveyor system and the second belt conveyor system counterbalance one another.

15. The control system according to claim 1, wherein the steerable, powered drive system comprises a plurality of controllably pivotable wheels, the control system further configured to orient the wheels to brace against forces induced by the material being conveyed by the first belt conveyor system and the second belt conveyor system.

16. A method for controlling a mobile conveyor vehicle for transporting material, the mobile conveyor vehicle including:
a first belt conveyor system and a second belt conveyor system mounted on a chassis and cooperatively coupled for conveyance of the material from an infeed end of the first belt conveyor system to an output end of the second belt conveyor system;
a first powered actuator system coupled to the first belt conveyor system for driving the infeed end to a desired location relative to the mobile conveyor vehicle;
a second powered actuator system coupled to the second belt conveyor system for driving the output end to a desired location relative to the mobile conveyor vehicle; and
a steerable, powered drive system for supporting and transporting the mobile conveyor vehicle on a surface,
the method automatically using a computer operatively coupled to a user interface, sensors of the mobile conveyor vehicle and actuators for controlling the mobile conveyor vehicle, the method comprising:
 a. receiving user input indicative of desired infeed location of the infeed end and a desired output location of the output end;
 b. determining a control solution for disposing the infeed end at the desired infeed location and disposing the output end at the desired output location; and
 c. cooperatively operating the first powered actuator system, the second powered actuator system and the powered drive system according to the control solution
wherein the steerable, powered drive system is operative in a first operating condition to rotate the chassis about a pivot point, the pivot point being selectable relative to the chassis, thereby rotationally positioning at least one of the first belt conveyor system and the second belt conveyor system, and wherein the determined control solution disposes the steerable, powered drive system to rotate the mobile conveyor vehicle around a selected pivot point.

17. The method according to claim 16, wherein one of the first belt conveyor system and the second belt conveyor system is non-rotatable horizontally with respect to the chassis.

18. The method according to claim 17, wherein the steerable, powered drive system comprises at least three controllably horizontally pivotable support arms attached to the chassis and a plurality of controllably horizontally pivotable and drivable wheels mounted at respective ends of the support arms, and wherein steering of the steerable, powered drive system comprises horizontal pivoting of one or both of the at least three support arms and the plurality of wheels.

19. The method according to claim 16, further comprising receiving signals from one or more sensors associated with the mobile conveyor vehicle, said one or more sensors configured to detect a location of an identified material source or material destination, and wherein the desired infeed location or output location is determined to correspond to the detected location of the identified material source or material destination, respectively.

20. The method according to claim 16, wherein determining the control solution is based on one or more further criteria selected from the group comprising: a total distance travelled by the material; a level of dust production due to material handling; a determined elevation angle of the first belt conveyor system or a determined elevation angle of the second belt conveyor system or both; a number of direction changes of the material during transport; and a loading level on one or more components including the first belt conveyor system, the second belt conveyor system, chassis and the steerable, powered drive system.

21. The method according to claim 16, wherein the control solution comprises a sequence of mobile conveyor vehicle poses for disposing the infeed end and the output end at a sequence of different configurations, each different configuration held for a particular amount of time according to the control solution, thereby facilitating conveyance of controllable amounts of material between a plurality of combinations of sources and destinations.

22. The method according to claim 16, further comprising determining, from sensor readings input thereto, a material flow rate indicative of a volumetric rate at which material is moved by the first belt conveyor system and the second belt conveyor system, said material flow rate accounting for an estimated amount of roll-back or bounce-back of material on the first belt conveyor system and the second belt conveyor system.

23. The control system according to claim 2, wherein another of the first belt conveyor system and the second belt conveyor system is horizontally rotatable about an axis and wherein the control solution disposes the steerable, powered drive system to align the pivot point with the axis.

24. The control system according to claim 1, wherein determining the control solution includes selecting the pivot point.

25. The control system according to claim 1, wherein the first operating condition corresponds to rotation of the mobile conveyor vehicle in place, and wherein a second operating condition of the mobile conveyor vehicle corresponds to transporting the mobile conveyor vehicle on the surface by orienting all wheels of the steerable, powered drive system in parallel.

26. The method according to claim 17, wherein another of the first belt conveyor system and the second belt conveyor system is horizontally rotatable about an axis and wherein the control solution disposes the steerable, powered drive system to align the pivot point with the axis.

* * * * *